US010392205B2

(12) United States Patent
Boston et al.

(10) Patent No.: US 10,392,205 B2
(45) Date of Patent: Aug. 27, 2019

(54) PEDESTRIAN-VEHICLE WARNING SYSTEMS FOR LOADING DOCKS

(71) Applicant: RITE-HITE HOLDING CORPORATION, Milwaukee, WI (US)

(72) Inventors: James J. Boston, Pittsburgh, PA (US); Troy L. Russell, Saukville, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 15/813,440

(22) Filed: Nov. 15, 2017

(65) Prior Publication Data

US 2018/0072519 A1   Mar. 15, 2018

Related U.S. Application Data

(63) Continuation of application No. 15/167,470, filed on May 27, 2016, now Pat. No. 9,896,282.

(51) Int. Cl.
| | |
|---|---|
| *B65G 69/00* | (2006.01) |
| *B65G 69/28* | (2006.01) |
| *G08B 21/02* | (2006.01) |

(52) U.S. Cl.
CPC ......... *B65G 69/003* (2013.01); *B65G 69/005* (2013.01); *B65G 69/2882* (2013.01); *G08B 21/02* (2013.01)

(58) Field of Classification Search
None
See application file for complete search history.

(56) References Cited

U.S. PATENT DOCUMENTS

| | | |
|---|---|---|
| 4,127,856 A | 11/1978 | Bickel |
| 4,634,334 A | 1/1987 | Hahn et al. |
| | (Continued) | |

FOREIGN PATENT DOCUMENTS

| | | |
|---|---|---|
| DE | 102015211187 | 12/2015 |
| EP | 0369106 | 5/1990 |
| | (Continued) | |

OTHER PUBLICATIONS

International Searching Authority, "International Search Report," issued in connection with International Patent Application No. PCT/US2017/030589, dated Jul. 25, 2017, 7 pages.

(Continued)

*Primary Examiner* — Fekadeselassie Girma
(74) *Attorney, Agent, or Firm* — Hanley, Flight & Zimmerman, LLC

(57) ABSTRACT

Example safety systems for use at a loading dock are disclosed. An example safety system includes a first sensor installed at the loading dock to sense the vehicle approaching the loading dock, where the first sensor is to provide a feedback signal in response to sensing the vehicle approaching the loading dock. An alarm device mounted at a lower elevation than a lowermost edge defining an opening that of the doorway. The alarm device being between a first lateral edge and a second lateral edge of the opening defining the doorway. The alarm device to provide an alarm signal to warn to a pedestrian in a path of the approaching vehicle in response to the feedback signal sensing the vehicle approaching the loading dock. The alarm signal being at least one of a visual warning or an audible warning.

23 Claims, 21 Drawing Sheets

(56) References Cited

U.S. PATENT DOCUMENTS

| | | | |
|---|---|---|---|
| 4,692,755 A | 9/1987 | Hahn | |
| 4,818,170 A | 4/1989 | Fisher et al. | |
| 4,843,373 A | 6/1989 | Trickle et al. | |
| 4,928,101 A | 5/1990 | Favors | |
| 4,949,074 A | 8/1990 | D'Ambrosia et al. | |
| 4,967,083 A | 10/1990 | Kornbrekke et al. | |
| 5,453,735 A * | 9/1995 | Hahn | B65G 69/003 340/687 |
| 5,703,368 A | 12/1997 | Tomooka et al. | |
| 5,739,523 A | 4/1998 | Tsutsumi et al. | |
| 5,762,459 A * | 6/1998 | Springer | B65G 69/005 188/32 |
| 5,964,572 A | 10/1999 | Hahn et al. | |
| 6,773,221 B2 | 8/2004 | Belongia et al. | |
| 7,045,764 B2 | 5/2006 | Beggs et al. | |
| 8,499,897 B2 | 8/2013 | Brooks et al. | |
| 8,616,826 B2 * | 12/2013 | Cotton | B65G 69/003 414/401 |
| 8,678,736 B2 * | 3/2014 | Andersen | B65G 69/003 414/401 |
| 8,905,198 B2 | 12/2014 | Brooks et al. | |
| 9,150,367 B2 | 10/2015 | Brooks et al. | |
| 9,227,799 B2 | 1/2016 | Brooks | |
| 9,926,148 B2 * | 3/2018 | Hochstein | B60Q 9/002 |
| 2001/0013009 A1 | 8/2001 | Greening et al. | |
| 2002/0041231 A1 | 4/2002 | Drinkard | |
| 2004/0075046 A1 | 4/2004 | Beggs et al. | |
| 2005/0140319 A1 | 6/2005 | Takashima | |
| 2005/0168999 A1 * | 8/2005 | Sommers | F21V 21/26 362/427 |
| 2006/0137261 A1 * | 6/2006 | Maly | B65G 69/2882 52/36.3 |
| 2006/0162254 A1 | 7/2006 | Imai et al. | |
| 2006/0187037 A1 | 8/2006 | Eubelen et al. | |
| 2007/0008124 A1 | 1/2007 | Stadler et al. | |
| 2007/0182550 A1 | 8/2007 | Castello et al. | |
| 2008/0022596 A1 * | 1/2008 | Boerger | E06B 9/82 49/31 |
| 2008/0127435 A1 * | 6/2008 | Maly | B65G 69/2882 14/71.1 |
| 2010/0127841 A1 | 5/2010 | D'Ambrosio et al. | |
| 2010/0146719 A1 | 6/2010 | Swessel et al. | |
| 2010/0170754 A1 | 7/2010 | Brooks et al. | |
| 2010/0266375 A1 | 10/2010 | Ion | |
| 2012/0025964 A1 * | 2/2012 | Beggs | B60Q 1/2673 340/435 |
| 2013/0223048 A1 | 8/2013 | Jeong | |
| 2013/0257607 A1 * | 10/2013 | Rigby | B60R 16/02 340/435 |
| 2013/0312205 A1 * | 11/2013 | Riviere | B65G 69/2882 14/71.3 |
| 2015/0375947 A1 * | 12/2015 | Hochstein | B60Q 9/002 348/143 |
| 2016/0009177 A1 * | 1/2016 | Brooks | B60K 35/00 340/468 |
| 2017/0341883 A1 | 11/2017 | Boston et al. | |

FOREIGN PATENT DOCUMENTS

| | | |
|---|---|---|
| EP | 1775692 | 4/2007 |
| EP | 1832866 | 9/2007 |
| EP | 2465796 | 6/2012 |
| EP | 2206664 | 3/2014 |
| EP | 2944522 | 11/2015 |
| GB | 2119987 | 11/1983 |
| WO | 97019875 | 6/1997 |
| WO | 2013009960 | 1/2013 |

OTHER PUBLICATIONS

International Searching Authority, "Written Opinion," issued in connection with International Patent Application No. PCT/US2017/030589, dated Jul. 25, 2017, 11 pages.

BEA Inc., "LZR®-Microscan—Stand-Alone, Door Mounted, Safety Sensor for Automatic Swing Doors (US version)," published Jan. 7, 2014, 12 pages.

BEA Inc., "LZR®-Microscan—Standalone, Door-Mounted, Swing Door Safety System," published Jan. 8, 2014, 2 pages.

BEA Inc., "Sparrow," published Jan. 2010, 2 pages.

BEA Inc., "Sparrow—Opening Sensor for Industrial Doors," published Mar. 2011, 2 pages.

BEA Inc., "Falcon—Opening Sensor for Industrial Doors," published Mar. 2011, 2 pages.

BEA Inc., "LZR®—i100—Safety Sensor for Industrial Doors," published Aug. 2011, 2 pages.

BEA Inc., "LZR®—i30—Laser Scanner for Industrial Doors," published Oct. 28, 2014, 12 pages.

Pepperl+Fuchs, "Ultrasonic sensor," published Aug. 12, 2015, 5 pages.

United States Patent and Trademark Office, "Non-Final Office Action," issued in connection with U.S. Appl. No. 15/167,470, dated May 19, 2017, 37 pages.

United States Patent and Trademark Office, "Final Office Action," issued in connection with U.S. Appl. No. 15/167,470, dated Aug. 24, 2017, 34 pages.

United States Patent and Trademark Office, "Notice of Allowance," issued in connection with U.S. Appl. No. 15/167,470, dated Nov. 9, 2017, 2017, 22 pages.

Erich Industries, "Safety Sentry Warning Signal Alarm," last retrieved from [https://www.erichindustries.com/SafetySentryWarningSignalAlarm.cfm] on Jan. 18, 2019, 6 pages.

European Patent Office, "Communication pursuant to Rules 161(1) and 162 EPC," issued in connection with European Patent Application No. 17724164.3, dated Jan. 8, 2019, 3 pages.

IP Australia, "Examination Report No. 1," issued in connection with Australian Patent Application No. 2017269805, dated Feb. 7, 2019, 3 pages.

* cited by examiner

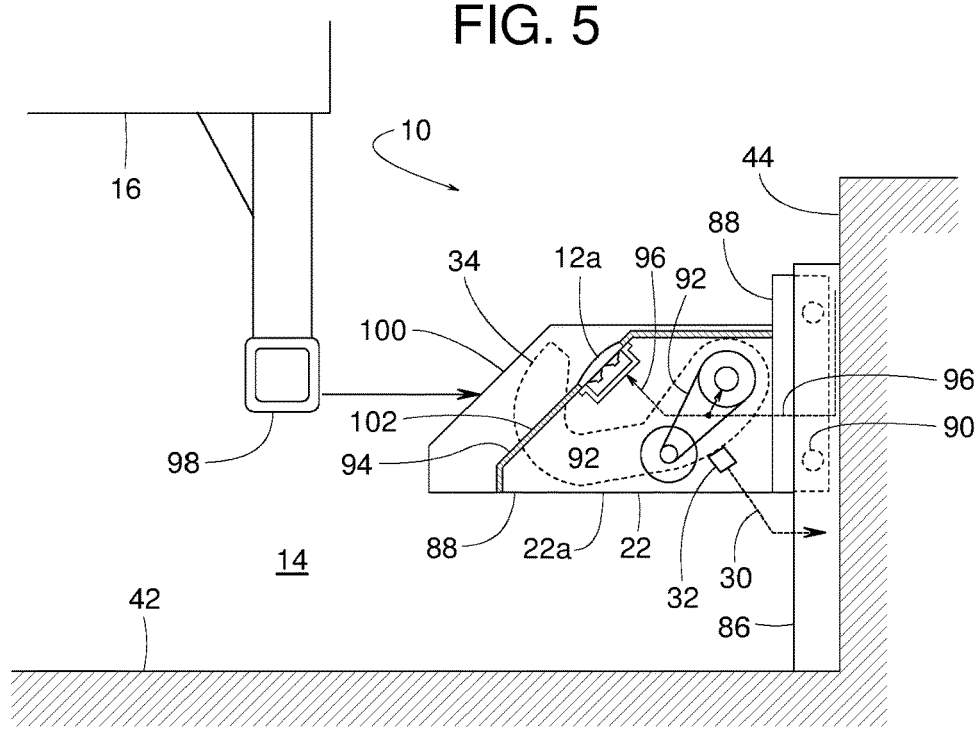
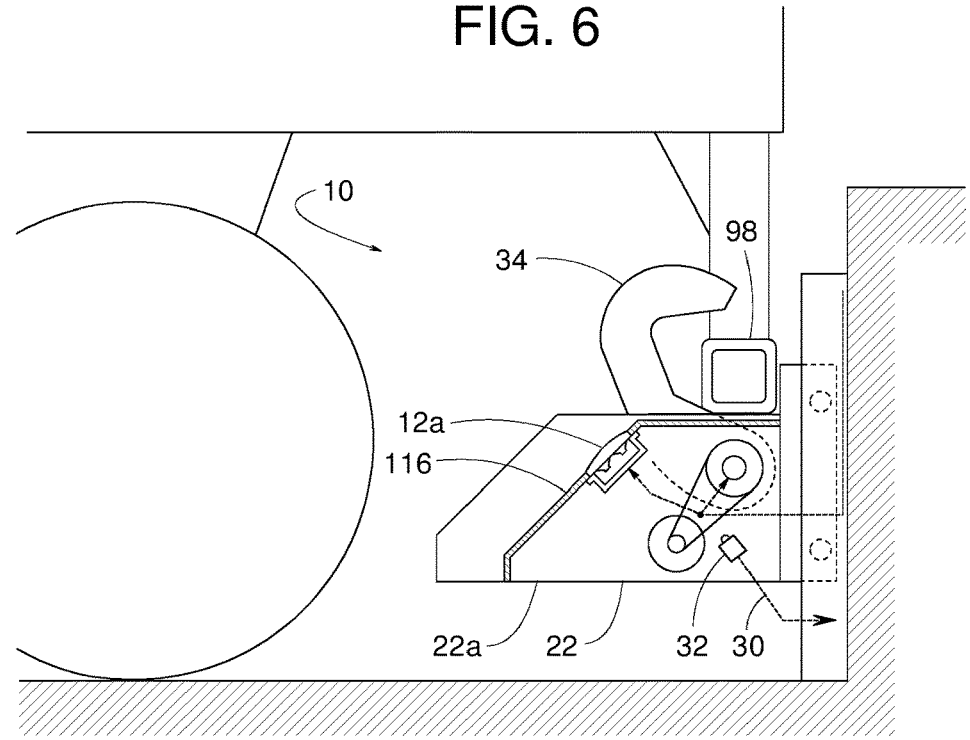

US 10,392,205 B2

PEDESTRIAN-VEHICLE WARNING SYSTEMS FOR LOADING DOCKS

CROSS-REFERENCE TO RELATED APPLICATION

This patent arises from a continuation of U.S. patent Ser. No. 15/167,470 (now U.S. Pat. No. 9,896,282), filed on May 27, 2016, which is hereby incorporated herein by reference in its entirety.

FIELD OF THE DISCLOSURE

The present disclosure relates generally to safety systems for loading docks and, more specifically, to pedestrian-vehicle warning systems for loading docks.

BACKGROUND

Loading docks provide an area for vehicles (e.g., trucks, trailers, etc.) to back up next to an elevated platform of a building so that cargo can be readily transferred between the vehicle and the building. Some loading docks include equipment, such as dock levelers and vehicle restraints. Dock levelers provide an adjustable bridge between the platform and a cargo bed of the vehicle. To prevent the vehicle from prematurely moving away from the platform, vehicle restraints are usually employed to engage a RIG (rear impact guard of the truck or trailer), a wheel, or some other feature of the vehicle.

To reduce the likelihood of a truck accidentally striking personnel that might be in the area (e.g., behind the vehicle), some loading docks have vehicle and/or personnel sensing systems. Although such systems might determine whether a person is within a certain area while a vehicle is present, current systems fail to take advantage of mounting locations and/or electrical power sources of existing equipment normally installed at loading docks.

BRIEF DESCRIPTION OF THE DRAWINGS

FIG. 5 is a side view showing some portions of FIG. 2 enlarged.

FIG. 6 is a side view showing some portions of FIG. 3 enlarged.

DETAILED DESCRIPTION

Figure 1:
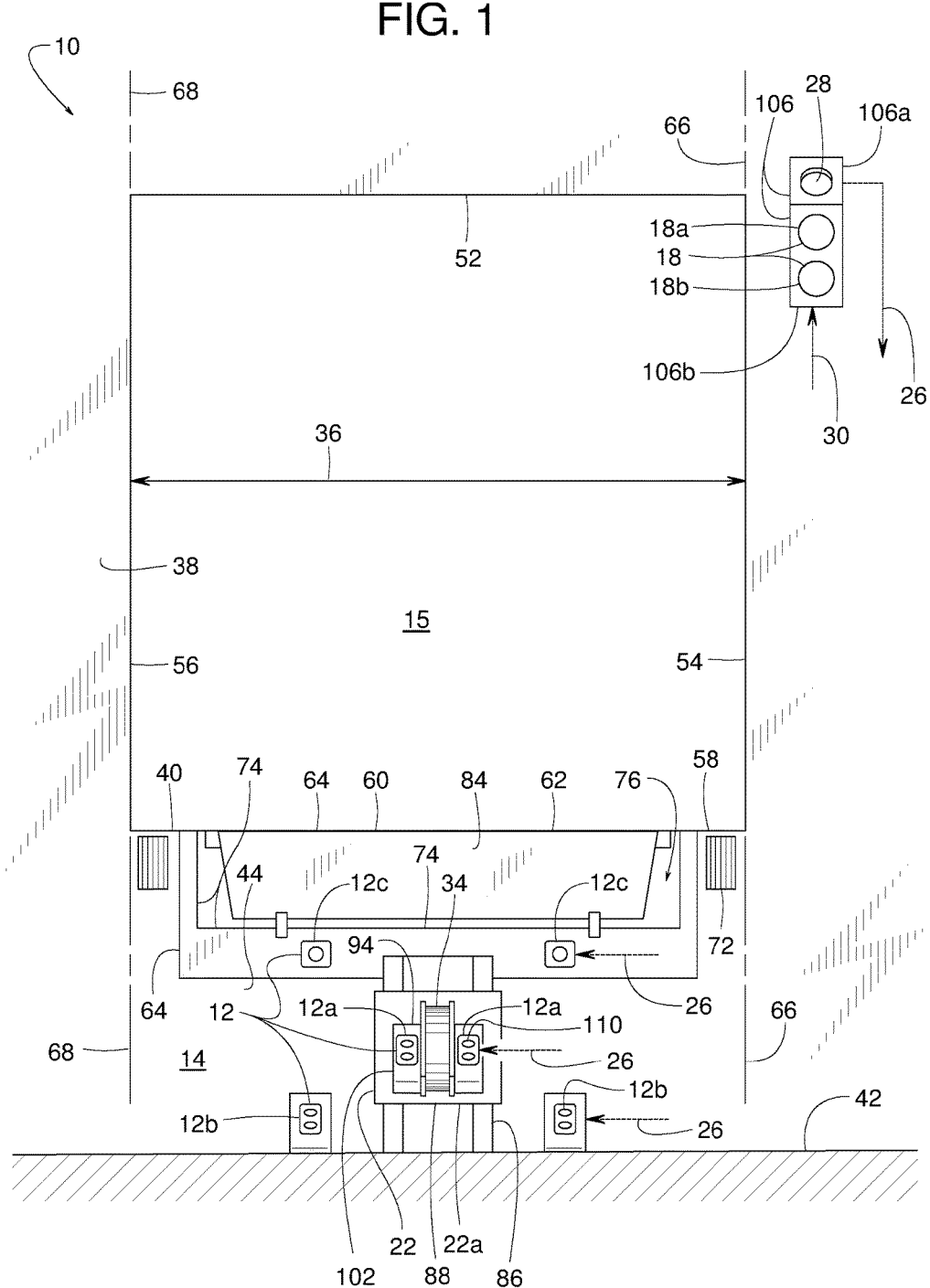
FIG. 1 is a front view of an example safety system constructed in accordance with the teachings disclosed herein.
Figure 2:
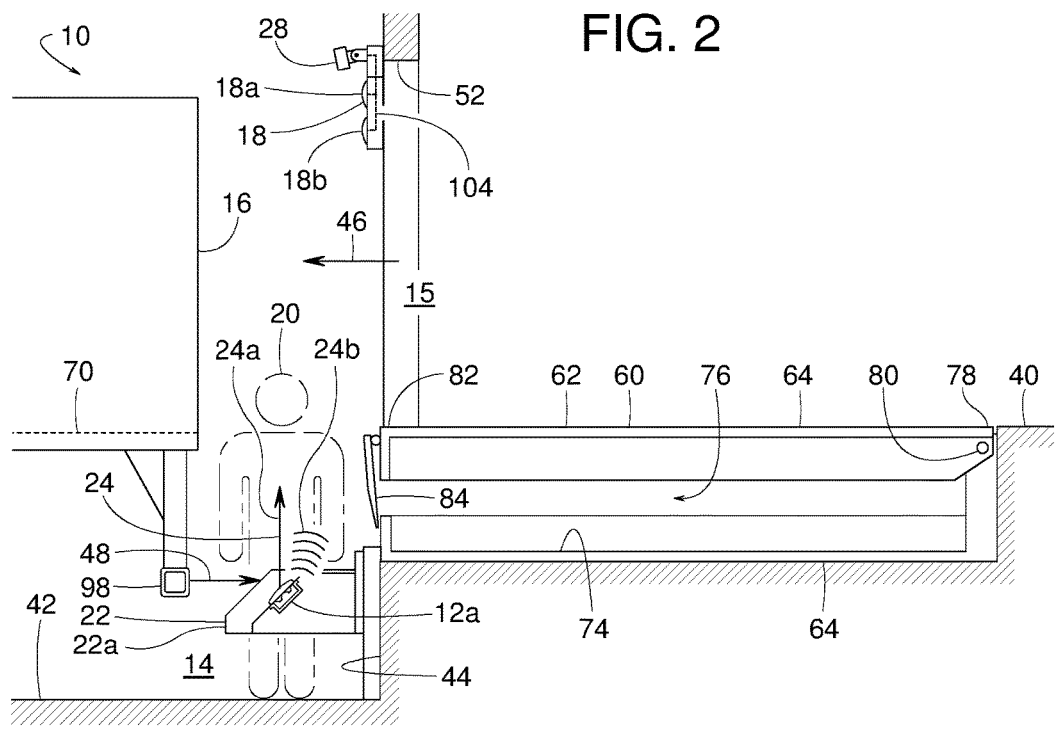
FIG. 2 is a side view of the example safety system shown in FIG. 1.

Example safety systems for use at a loading dock are disclosed herein. The example safety systems may be employed with loading docks that are configured to receive a vehicle (e.g., truck or trailer) approaching a doorway of the dock. The example safety systems may be used to avoid pedestrian-vehicle collisions at loading docks. The example safety systems disclosed herein may include an alarm device and/or a signal device. For example, the signal device, in response to feedback from a sensor associated with a vehicle restraint at the dock, alerts the vehicle's driver whether the vehicle restraint is configured to receive and/or restrain the vehicle. The alarm device, on the other hand, alerts or warns a nearby dockworker of an approaching vehicle. The alarm device emits an alarm signal (e.g., visual signal, an audio signal, flashing lights, colored lights, etc.) in response to feedback from a sensor that detects the vehicle. The signal device, the alarm device and the sensor are strategically placed or positioned to provide the dockworker with a prominent warning without sending the driver mixed messages from multiple devices. In some examples, the alarm device moves to a progressing hidden position from the view point of the vehicle's driver as the vehicle approaches the doorway.

FIGS. 1-15 and 30-33 show examples of a safety system 10 that includes an alarm device 12 (e.g., alarm devices 12a, 12b, 12c, 12d, 12e, 12f and 12g) for use at a loading dock 14 where a vehicle 16 (e.g., a truck, a trailer, etc.) can be loaded or unloaded of its cargo at a doorway 15. The alarm device 12 is used concurrently with a separate signal device 18, which is also installed at the dock 14. The alarm device 12 of the illustrated example provides a warning to a pedestrian 20 (e.g., a dockworker) of an approaching vehicle 16 backing into dock 14, and the signal device 18 informs the vehicle's driver as to whether a vehicle restraint 22 (e.g., RIG-engaging vehicle restraint 22*a* or wheel-engaging vehicle restraints 22*b*, 22*c* and 22*d*) at the dock 14 is configured to receive and/or restrain the vehicle 16.

The alarm device 12 of the illustrated example emits an alarm signal 24 (visual signal 24*a* and/or audible signal 24*b*) in response to a feedback signal 26 from a sensor 28 that detects the vehicle 16 at the dock 14. The sensor 28 may be any device (e.g., motion detector, touchless sensor) that provides a feedback signal in response to detecting the presence or movement of vehicle 16 without having to physically contact the vehicle 16. In some examples, the sensor 28 provides the feedback signal 26 in response to sensing the vehicle 16 moving toward the doorway 15.

The sensor 28 detecting vehicle presence or movement operates under one or more various known principles, examples of which include, but are not limited to, active infrared, passive infrared, ultrasonic, radar, microwave, laser, electromagnetic induction, ultra-IR LED, time-of-flight pulse ranging technology, photoelectric eye, thermal, video analytics, and various combinations thereof. Some specific sensor examples include, but are not limited to, a model BEA LZR, a model BEA Sparrow, a model BEA Falcon, a model LZR-i100, a model BEA LZR-i30, a model UC4000 Ultrasonic Sensor, and a model 82100 Multi-Beam LED Scanner. The BEA LXR examples are products of BEA Industrial of Belgium, and the R2100 and the UC400 examples are products of Pepperl & Fuchs of Germany.

The signal device 18, on the other hand, operates in response to a feedback signal 30 from a vehicle restraint sensor 32 that senses the status or configuration of vehicle restraint 22. The feedback signal 30 between the sensor 32 and the signal device 18 may be communicatively conveyed via wireless communication and/or hardwire communication. The sensor 32 determines whether the vehicle restraint 22 is configured in an operative vehicle-restraining configuration (e.g., FIGS. 6 and 8) or configured in a release configuration (FIGS. 5 and 9) to receive or release the vehicle 16. In some examples, the signal device 18 emits a generally red light 18*a* when the vehicle restraint 22 is in the operative vehicle-restraining configuration (FIG. 6) and emits a generally green light 18*b* when the vehicle restraint 22 is in the release configuration (FIG. 5). In some examples, the sensor 32 senses the position of a vehicle-blocking barrier 34 of the vehicle restraint 22. Examples of the sensor 32 include, but are not limited to, an electromechanical limit switch, a pressure switch, a proximity switch, an encoder, and/or a current sensor and/or any other sensing apparatus or means (e.g., for determining the configuration of the vehicle restraint 22).

Figure 3:
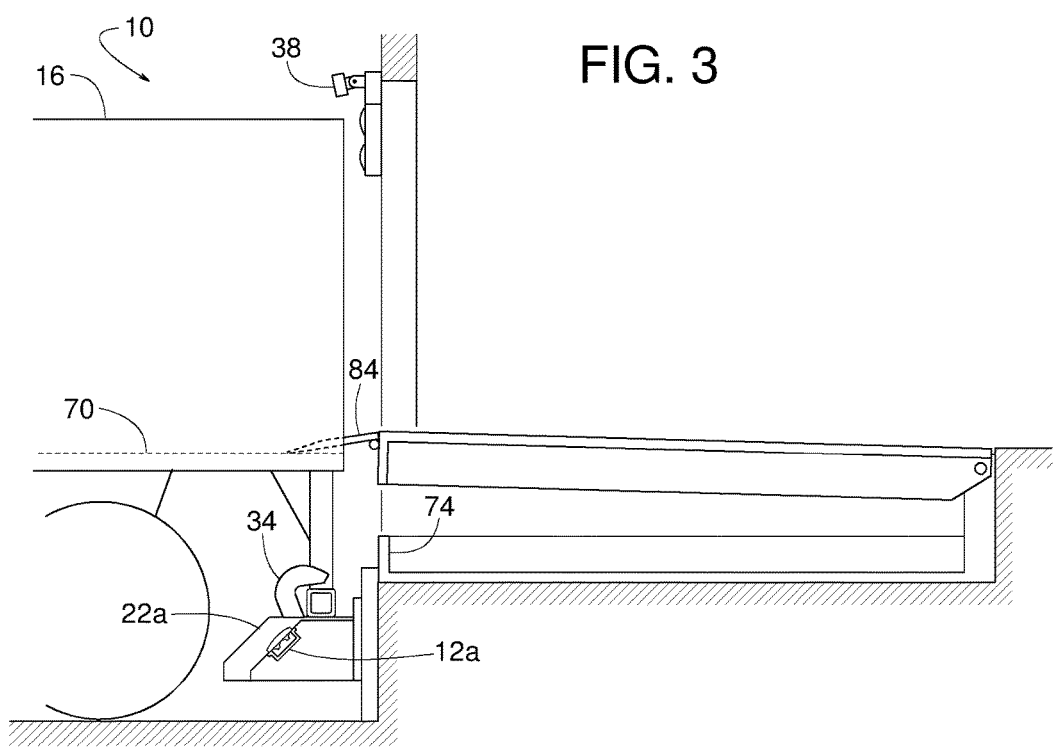
FIG. 3 is a side view similar to FIG. 2 but showing an alternate configuration of some dock leveler equipment that may be used with the example safety systems disclosed herein.
Figure 4:
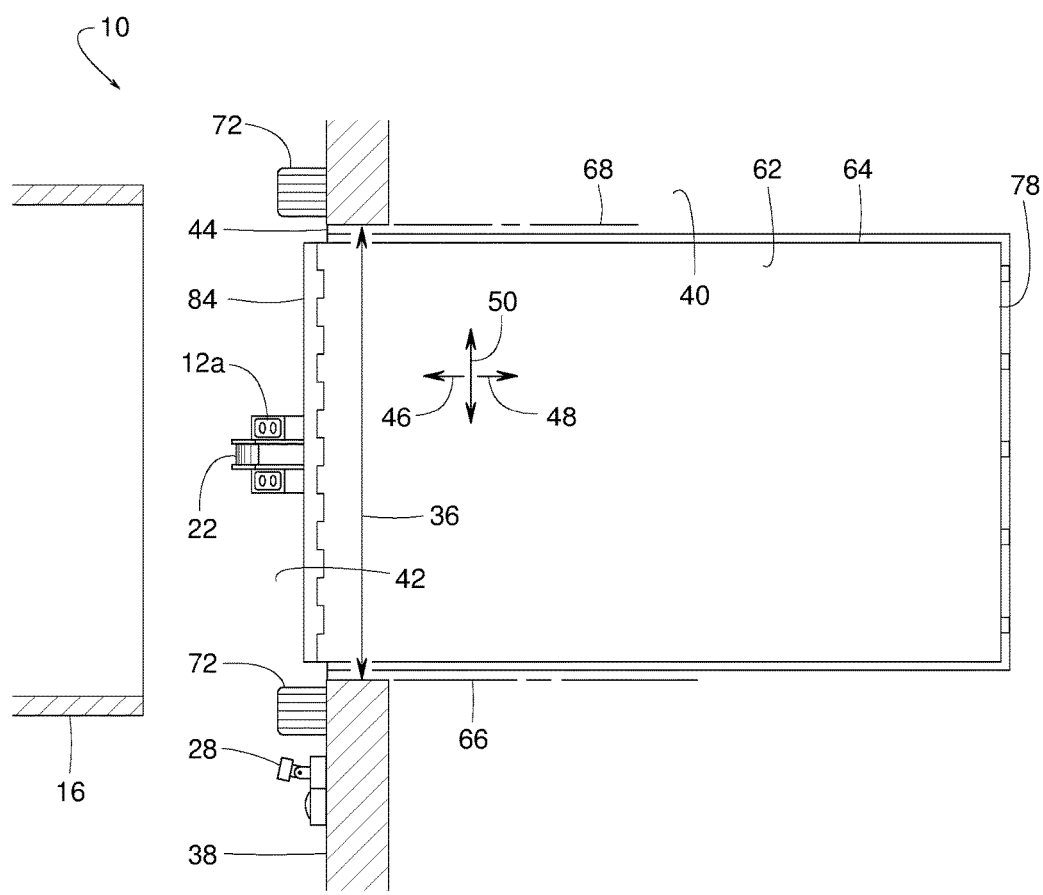
FIG. 4 is a top view of FIG. 2.
Figure 7:
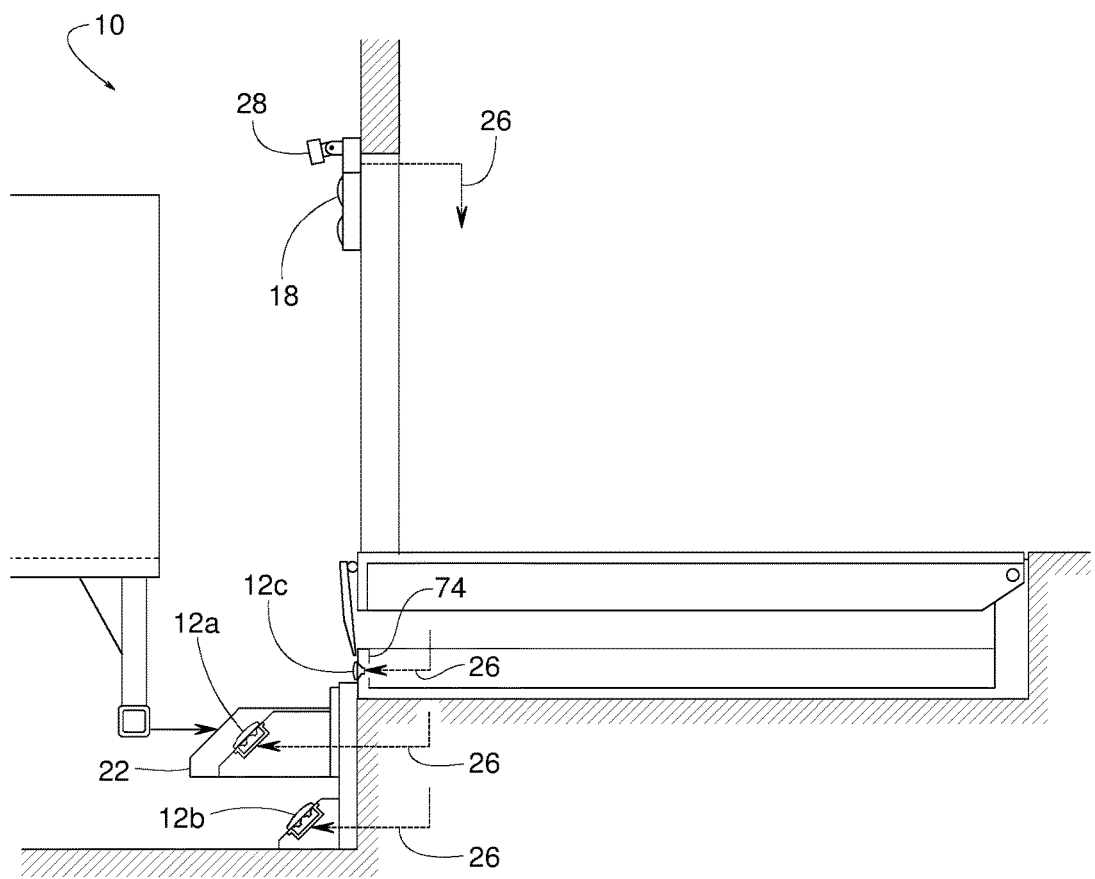
FIG. 7 is a side view similar to FIG. 2 but showing another example safety systems constructed in accordance with the teachings disclosed herein.

The alarm signal 24 of the illustrated example emits a signal distinguishably different from the signal of the signal device 18. For example, in examples where the signal device 18 selectively emits a red or green light, the alarm signal 24 of the illustrated example does not emit a red light or a green light. Examples of the alarm signal 24 include, but are not limited to, a visual signal such as one or more lights (e.g., other than red or green if red or green is emitted by the signal device 18), a flashing light, a colored light, an audible signal, a graphical display, a horn, and/or various combinations thereof. In some examples, the alarm signal 24 may be projected downward to illuminate an area on a driveway 42 to provide the pedestrian of a warning. In some examples, the alarm signal 24 may include an audio signal or alarm in the form of a horn. To prevent the alarm device 12 and the signal device 18 from sending or emitting mixed messages to the driver of the vehicle 16, the alarm device 12 is mounted at a strategic location that is prominently visible to the pedestrian 20 but is generally hidden from the driver's view (e.g., through a rear view mirror). To further enhance this effect, some examples of the alarm device 12 descend or otherwise move so as to become progressively hidden as vehicle 16 travels from an approach position (FIGS. 2, 4, 5 and 7) toward a parked position at the dock 14 (FIGS. 3 and 6). The alarm device 12*a*, for example, is mounted to a moving portion of the vehicle restraint 22*a* such that the alarm device 12*a* moves from a raised position (FIG. 5) to a lowered position (FIG. 6) in response to the vehicle 16 backing into the dock 14. While the alarm device 12*a* descends, some examples of the sensor 28 remain at a fixed position to ensure that the sensor 28 continues to effectively sense a presence or movement of the vehicle 16.

In the illustrated examples, the alarm device 12 is installed below the doorway 15 of the dock 14 and within the doorway's width 36 (e.g., between lateral edges of the doorway 14). With the alarm device 12 mounted in a generally low, central location directly behind the vehicle 16 (or at least behind or below a portion of vehicle 16), the vehicle 16 blocks the driver's view of the alarm device 12. In addition, such mounting location is ideal for warning the pedestrian 20 because it is in this area that the pedestrian 20 might be hidden from the driver's view and, thus, more likely to be struck by the vehicle 16 backing into the dock 14. The signal device 18, on the other hand, is mounted at a much higher location and beyond the doorway's width 36 so that the driver can maintain sight of the signal device 18 even after the vehicle 16 has backed (e.g., fully backed) into the dock 14. For example, the signal device 18 of the illustrated example is positioned adjacent a lateral edge of the doorway 15 (e.g., upper right-hand corner of the doorway 15 in the orientation of FIG. 1).

Although the alarm device 12 and the signal device 18 can be installed at any type of loading dock, the illustrated example of the dock 14 includes the doorway 15 in a wall 38, an interior platform 40, and a lower exterior driveway 42. The wall 38 and the doorway 15 are generally between the platform 40 and the driveway 42. The driveway 42 provides the vehicle 16 with a path (e.g., a vehicle travel path) leading to the doorway 15. An exterior or forward-facing surface 44 of the wall 38 extends vertically between the driveway 42 and the platform 40. The term, "forward-facing" is with reference to a forward direction 46, which is opposite to a rearward direction 48, perpendicular to wall 38, and points from the doorway 15 to the vehicle 16 when the vehicle 16 is in a parked position. A lateral direction 50 is horizontal and perpendicular to the forward direction 46.

The doorway 15 has an upper edge 52 extending horizontally between vertical lateral edges (a first lateral edge 54 and a second lateral edge 56). A lower boundary 58 of the doorway 15 is defined by an upper surface of the platform 40 and/or an upper surface 60 of a pivotal deck 62 of a dock leveler 64 installed at the dock 14. The lateral edges 54 and 56 define the width 36 of the doorway 15. The first lateral edge 54 lies along a first lateral plane 66, and second lateral edge 56 lies along a second lateral plane 68, where the lateral planes 66 and 68 are substantially perpendicular to the wall 38. The term, "plane" is a spatial geometric term and so it is not necessarily an actual physical structure.

The interior platform 40 is preferably at about the same elevation as a cargo bed 70 of the vehicle 16 to facilitate transferring cargo between the platform 40 and the vehicle 16. To further facilitate the transfer of cargo, illustrated examples of the dock 14 include the dock leveler 64, the vehicle restraint 22, and/or the bumpers 72. The bumpers 72 reduce impact forces imparted by the vehicle 16 and establish a properly parked position of the vehicle 16 relative to the surface 44 and the dock leveler 22.

In the illustrated example, the dock leveler 64 has a stationary dock leveler frame 74 installed within a pit 76 of the platform 40. The dock leveler 64 also includes the deck 62, which has a rear edge 78 pivotally coupled to the frame 74. A pivotal connection 80 at the rear edge 78 allows the deck 62 to pivot so that a height of the deck's front edge 82 can be adjusted (e.g., raised or lowered) to generally match or align with the height of the vehicle's cargo bed 70. A pivotal or otherwise extendible lip 84 extends from deck 62 to span a gap between the deck's front edge 82 and the vehicle's cargo bed 70. In this manner, the deck 62 and the lip 84 provide an adjustable bridge between the platform 40 and the vehicle's cargo bed 70 so that personnel and/or material handling equipment can readily travel between the platform 40 and the bed 70.

To prevent vehicle 16 from prematurely departing dock 14 during loading and/or unloading operations, some examples of the vehicle restraint 22 include a stationary track 86, a frame 88, a track follower 90 (e.g., rollers or guide blocks) to guide the movement of frame 88 along track 86, the barrier 34 (e.g., a hook or other suitable obstruction) pivotally or otherwise movably coupled to the frame 88, a drive unit 92 (e.g., an electric motor, drive shaft, sprockets, roller chain, cogged timing belt, drive train, etc.) to move the barrier 34 relative to the frame 88, and a vehicle restraint housing 94 to shelter, house or guard the drive unit 92 and/or shelter, house or guard other vehicle restraint components (e.g., an electrical wire 96, a limit switch, a sensor, the vehicle restraint sensor 32, etc.). The drive unit 92 is powered to move barrier 34 between a blocking position (e.g., FIGS. 3 and 6) and a release position (e.g., FIGS. 1, 2, 4, 5 and 7), thereby configuring vehicle restraint 22a selectively to an operative configuration (FIGS. 3 and 6) and a stored configuration (e.g., FIGS. 1, 2, 4, 5 and 7), respectively.

To change the vehicle restraint 22a from the stored configuration to the operative configuration, the drive unit 92 rotates the barrier 34 (e.g., in an upward direction) in front of the vehicle's rear impact guard 98 to create an obstruction to inhibit the vehicle 16 from prematurely departing the dock 14. The barrier 34 rotates (e.g., in a downward direction) to the release position to configure the vehicle restraint 22a to the stored configuration. When the vehicle restraint 22a is in the stored configuration with the barrier 34 in the release position, the vehicle 16 is free to enter or leave the dock 14 without significant resistance or obstruction from the vehicle restraint 22a.

In the illustrated examples, the frame 88 and thus all of the vehicle restraint components carried by the frame 88 are vertically movable relative to the track 86. In some examples, a spring force urges the frame 88 to an uppermost position shown in FIGS. 1, 2, 5 and 7. As the vehicle 16 backs into the dock 14, the rear impact guard 98 slides along an inclined surface 100 of the frame 88 to push the frame 88 (e.g., downward) underneath the rear impact guard 98, as shown in FIGS. 3 and 6. Once the vehicle 16 is at the parked position, the drive unit 92 moves or lifts the barrier 34 to the blocking position. In some examples, the bumpers 72 mounted to the wall 38 and/or to the dock leveler frame 74 establish the vehicle's properly parked position. The bumpers 72 are only shown in FIGS. 1 and 4 to avoid cluttering the illustration of other features of the dock leveler 64 and the vehicle restraint 22.

FIGS. 1, 7, 8 and 9 show various example mounting locations of the alarm device 12, the sensor 28, and the signal device 18. Each of the illustrated example mounting locations of the alarm device 12 is within an area below the doorway 15, above the driveway 42, and between the two lateral planes 66 and 68 (e.g., the lateral edges 54 and 56 of the doorway 15). In the illustrated example, the alarm device 12 includes a plurality of alarm devices 12a, 12b, 12c and 12d. More specifically, one or more alarm devices 12a are attached to the vehicle restraint 22a, one or more alarm devices 12b are attached to the driveway 42 and/or to the wall 38, one or more alarm devices 12c are attached to the frame 74 of the dock leveler 64, and/or one or more alarm devices 12d are attached to one or more wheel chock style vehicle restraints 22b. In some examples, only a single alarm device 12a, 12b, 12c or 12d is installed at the dock 14 at just one of the example mounting locations (e.g., as shown in FIG. 1).

In some examples, the alarm device 12a is housed within the same enclosure 102 that shelters or houses one or more vehicle restraint components of the vehicle restraint 22. The terms, "housing," "enclosure" and their derivatives are equivalent and used interchangeably, and these terms refer to any shelter or encasement to at least partially shield or guard one or more internal components from, for example, external elements (e.g., the weather). The term, "vehicle restraint component" refers to any part of the vehicle restraint. Examples of a vehicle restraint component include, but are not limited to, a frame, a housing, an enclosure, a barrier, an electrical wire, an electrical conductor, a drive unit, a sensor, and/or a guide track related part. In some examples, the alarm device 12a is mounted to the track 86, which is substantially stationary. In some examples, the alarm device 12a and the drive unit 92 share the same enclosure 102, which reduces the part count of the vehicle restraint 22a and thus reduces the manufacturing cost of the vehicle restraint 22a.

To further reduce manufacturing costs, some examples of the safety system 10 disclosed herein have the alarm device 12 electrically wired to the vehicle restraint 22. A first item being "electrically wired" to a second item means that an electrical conductor conveys electricity between the two items. In some examples, an alarm device being electrically wired to a vehicle restraint means that an electrical conductor (e.g., the wire 96) conveys electricity from the vehicle restraint (e.g., from an electric motor or from some other electrical component of the vehicle restraint) to power the alarm device, or vice versa. The term, "electrical component" refers to any part that uses or conveys electricity.

In addition or alternatively, some examples of the safety system 10 disclosed herein have reduced manufacturing and installation costs by having the sensor 28 electrically wired to the signal device 18. In some examples, a sensor being electrically wired to a signal device means that an electrical conductor (e.g., a wire 104) conveys electricity between the sensor and the signal device. In some examples, manufacturing and installation costs are further reduced by having the sensor 28 and the signal device 18 share a common enclosure 106. In some examples, the enclosure 106 includes a sensor housing 106a mounted adjacent to a signal housing 106b, which provides an advantage somewhat similar to that provided by a single enclosure 106.

Figure 8:
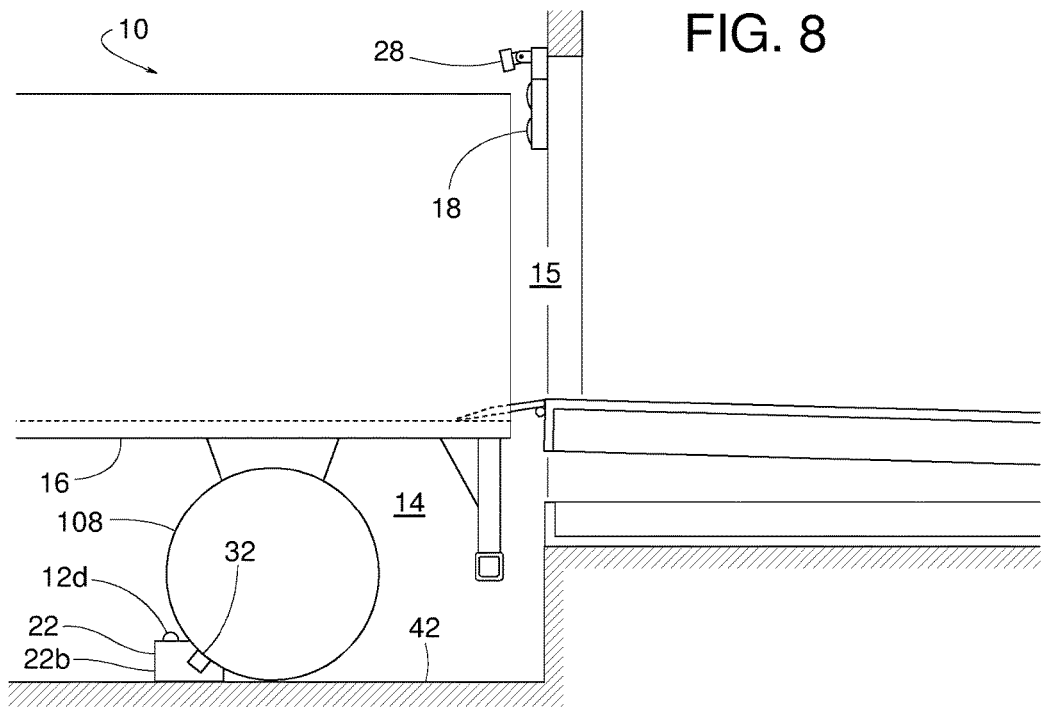
FIG. 8 is a side view similar to FIG. 3 but showing another example safety system constructed in accordance with the teachings disclosed herein.
Figure 9:
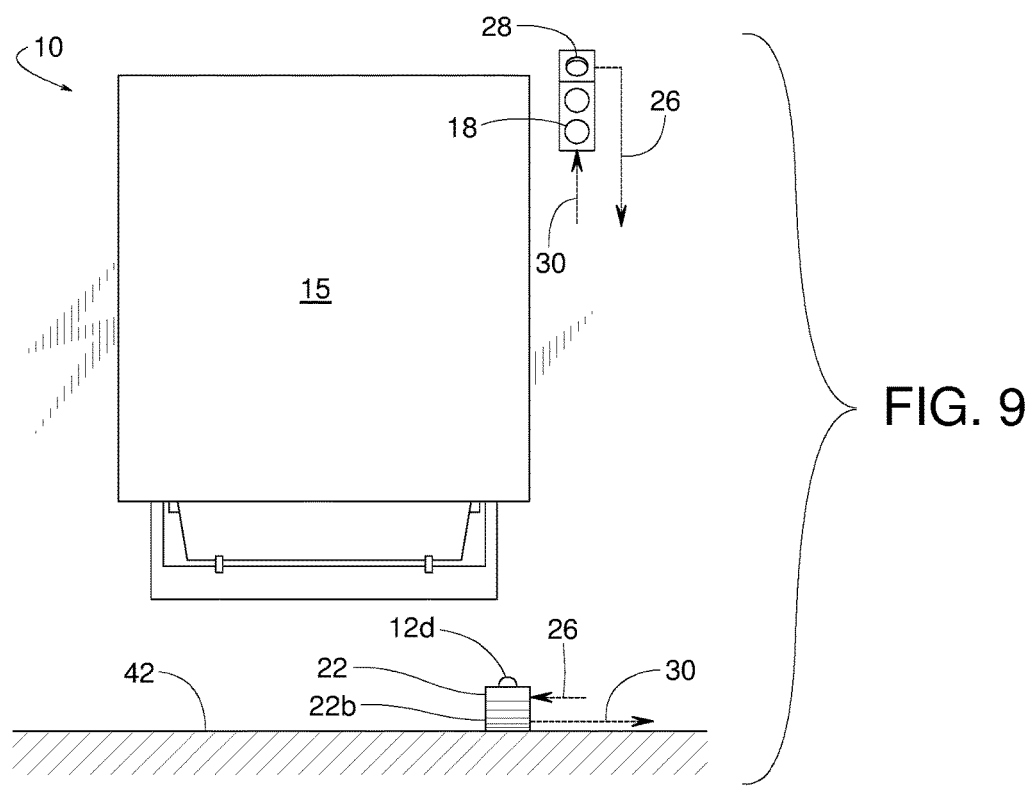
FIG. 9 is a front view similar to FIG. 1 but showing the example safety system of FIG. 8.

In the example shown in FIGS. 8 and 9, the alarm device 12*d* is installed within a wheel-chock style vehicle restraint 22*b*. In this example, the vehicle restraint 22*b* is manually or otherwise placed selectively in front of a wheel 108 of the vehicle 16 to restrain the vehicle 16 and prevent the vehicle 16 from prematurely departing the dock 14. In some examples, a wireless communication link (e.g., radio waves, Bluetooth, Wi-Fi, etc.) conveys the feedback signal 26 from the sensor 28 to the alarm device 12*d*. Some examples of the vehicle restraint 22*b* include the vehicle restraint sensor 32 configured to sense the presence of the vehicle's wheel 108. Wireless communication, in some examples, conveys the feedback signal 30 to the signal device 18.

In some examples where the alarm device 12 includes one or more lights 110 to emit an alarm signal 24*a*, the lights 110 are LEDs (light emitting diodes), which are particularly tough and resistant to mechanical shock and rough handling. This can be an important feature in examples where the alarm device 12 is movable and/or subject to vibration due to movement of the vehicle 16 and/or the normal operation of the dock leveler 64 and/or the vehicle restraint 22.

Figure 10:
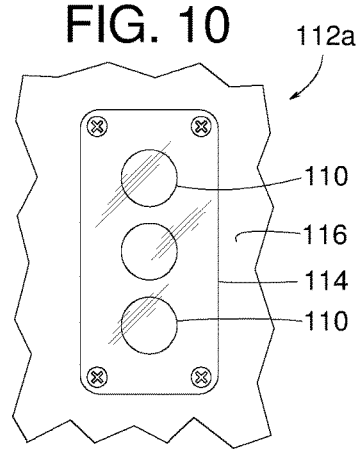
FIG. 10 is a front view of an example display arrangement for example alarm devices disclosed herein.
Figure 11:
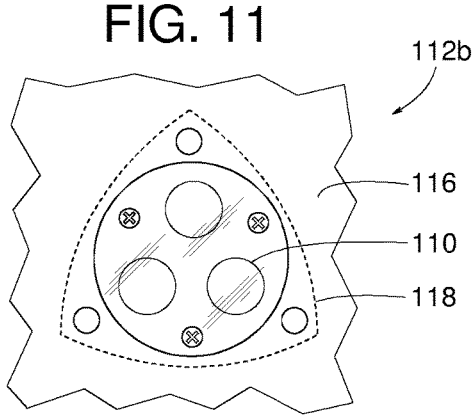
FIG. 11 is a front view of another example display arrangement for example alarm devices disclosed herein.
Figure 12:
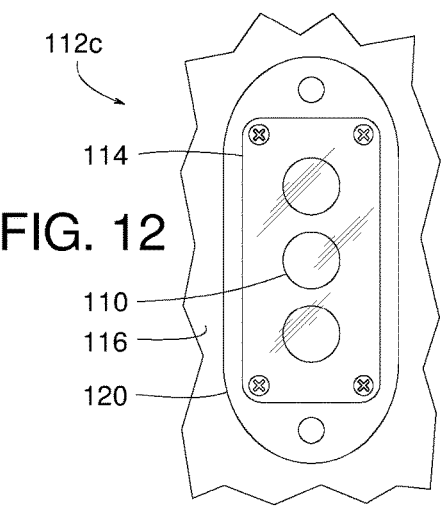
FIG. 12 is a front view of another example display arrangement for example alarm devices disclosed herein.
Figure 13:
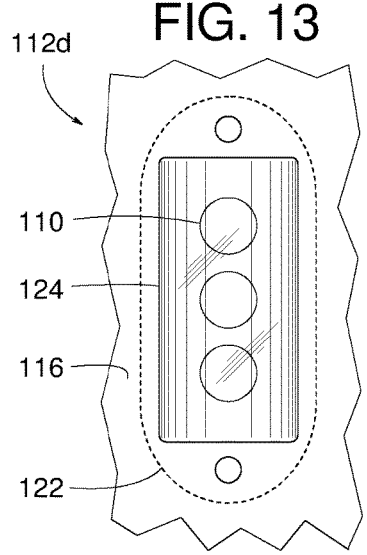
FIG. 13 is a front view of another example display arrangement for example alarm devices disclosed herein.
Figure 14:
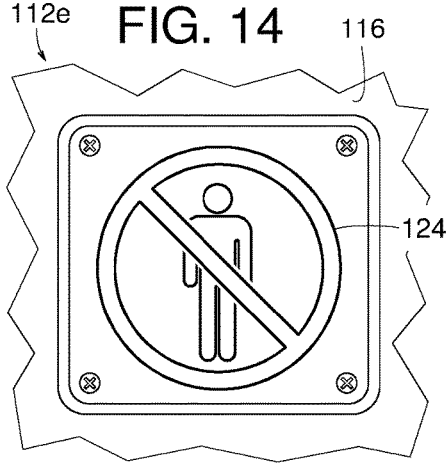
FIG. 14 is a front view of another example display arrangement for example alarm devices disclosed herein.
Figure 15:
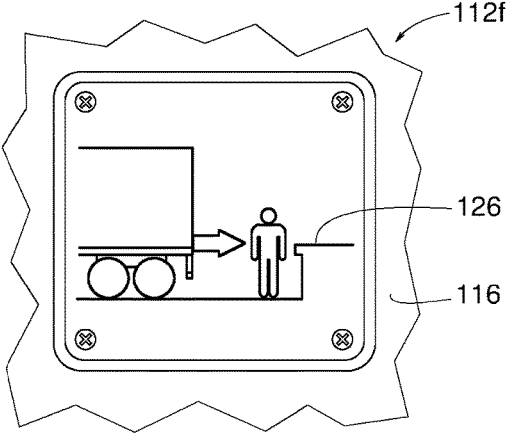
FIG. 15 is a front view of yet another example display arrangement for example alarm devices disclosed herein.

FIGS. 10-15 show various designs and configurations of the alarm device 12. FIG. 10 shows the alarm device 12 having a display arrangement 112*a* including (e.g., three) lights 110 behind a clear lens 114 attached to a supporting structure 116. Examples of the supporting structure 116 include, but are not limited to, a vehicle restraint housing/enclosure (e.g., alarm device 12*a* and 12*d*), a separate housing/enclosure (e.g., the alarm device 12*b*), and the frame 74 of the dock leveler 64 (e.g., alarm device 12*c*). FIG. 11 shows a display arrangement 112*b* with (e.g., three) lights 110 behind a generally rectangular or circular lens 118 attached to the backside of the supporting structure 116. FIG. 12 shows a display arrangement 112*c* similar to the display arrangement 112*a* of FIG. 10 but with an external faceplate 120 used to mount the lens 114 to the supporting structure 116. FIG. 13 shows a display arrangement 112*d* similar to the display arrangements 112*a* and 112*c* but with a back-plate 122 used to mount a semi-cylindrical lens 124 to the supporting structure 116. FIG. 14 shows a display arrangement 112*e* where the alarm signal 24 is in the form of an example graphical display 124. FIG. 15 shows a display arrangement 112*f* where the signal 24 is in the form of another example graphical display 126. In some examples, the displays 124 and 126 are backlit panels that are at least partially transparent or translucent.

Figure 16:
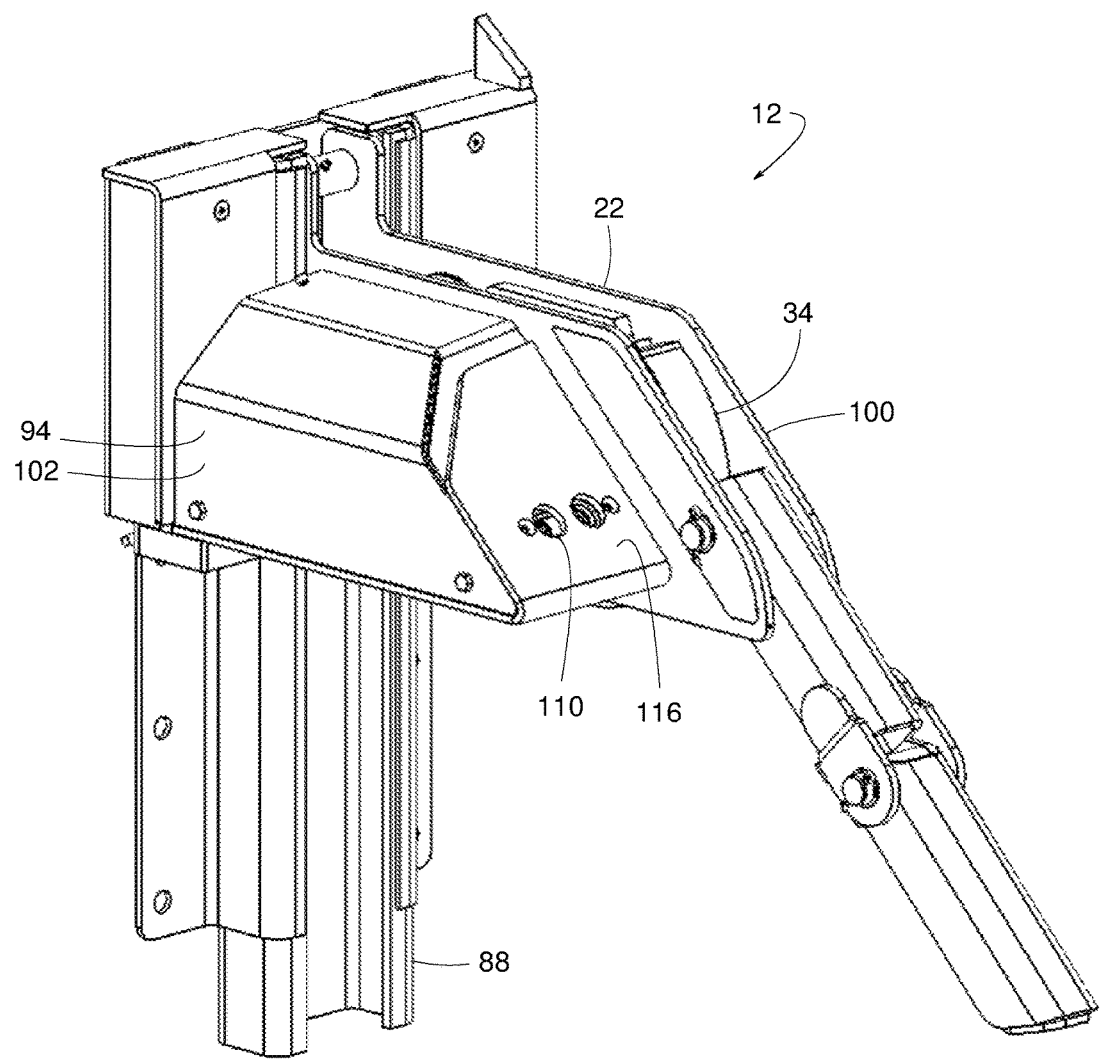
FIG. 16 is a perspective view of an example alarm device constructed in accordance with the teachings disclosed herein.
Figure 17:
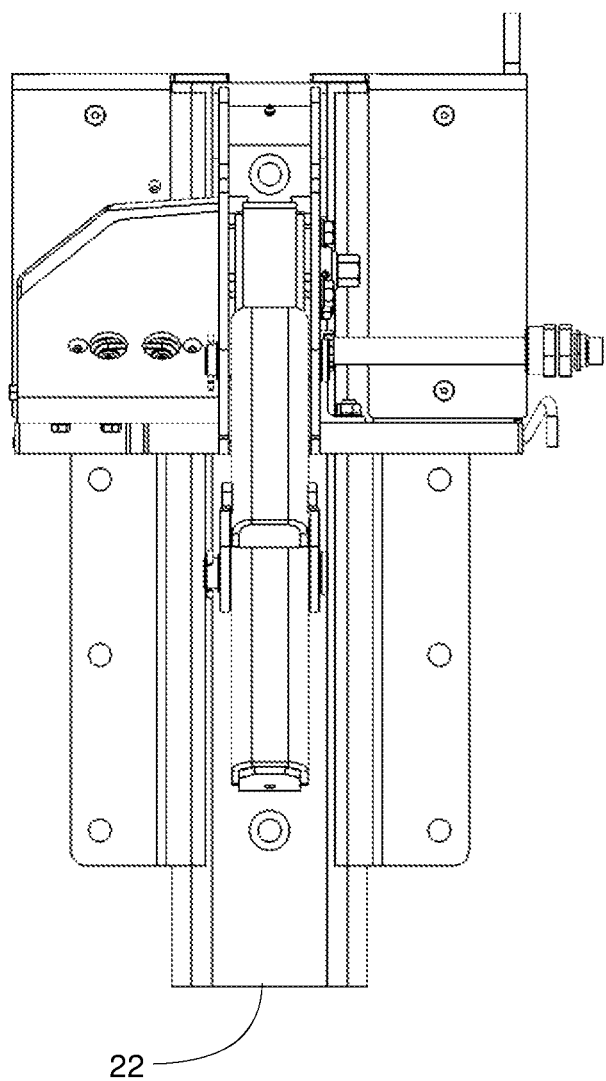
FIG. 17 is a right-front view of FIG. 16.
Figure 18:
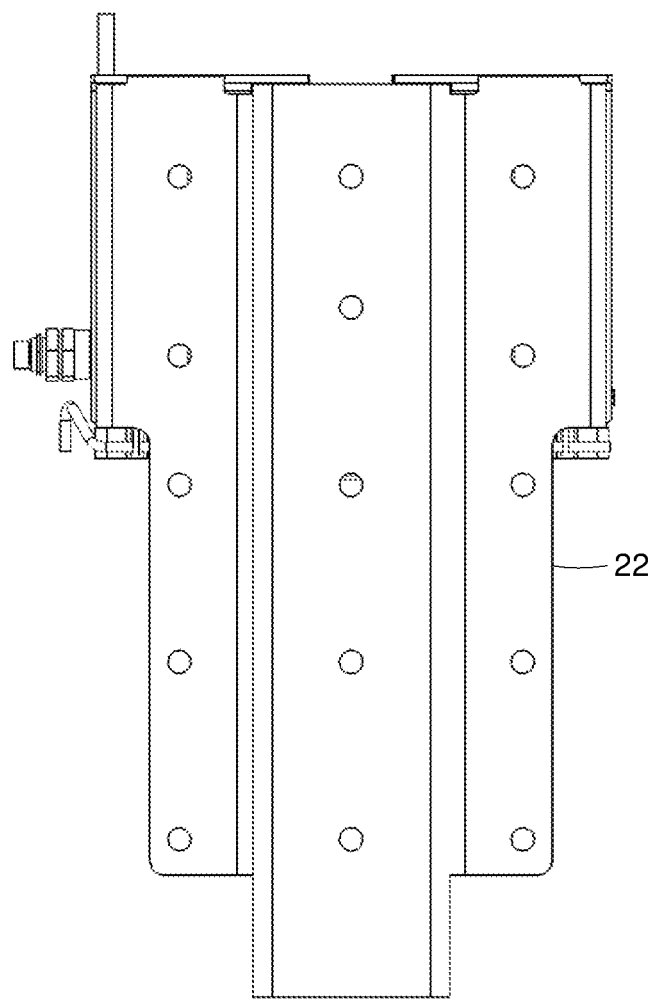
FIG. 18 is a back view of FIG. 17.
Figure 19:
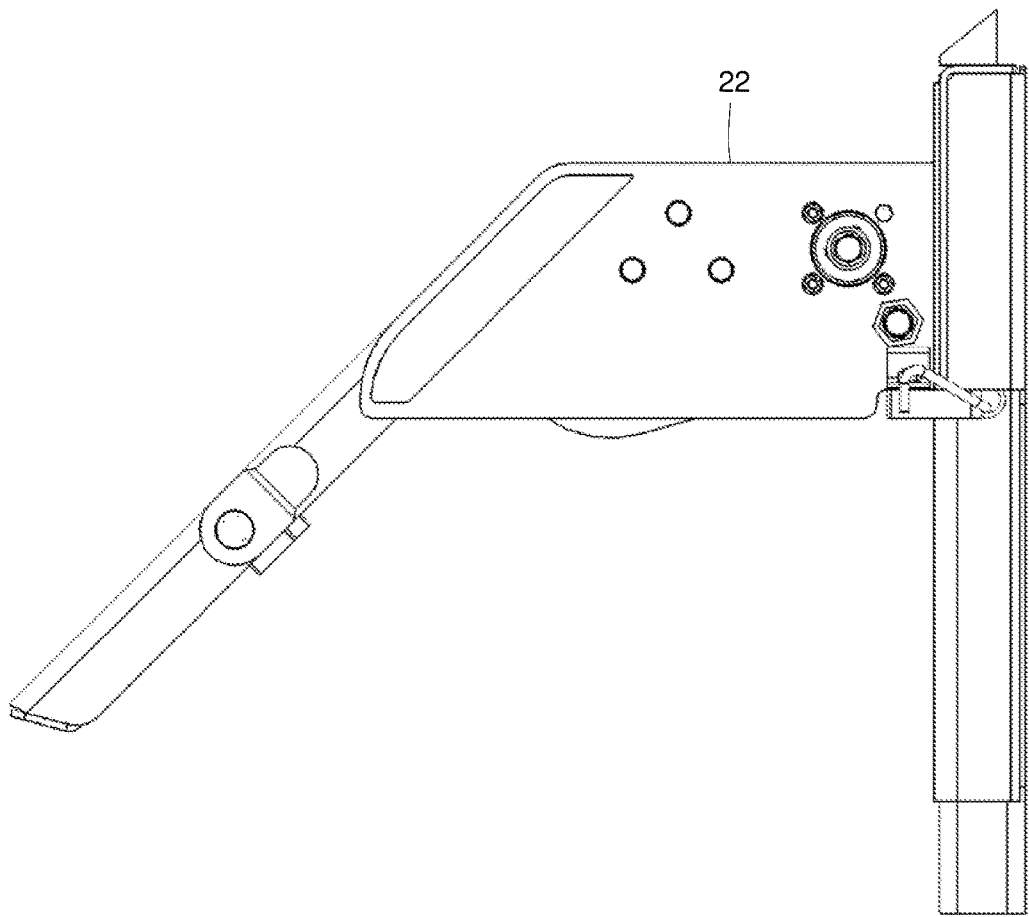
FIG. 19 is a right view of FIG. 17.
Figure 20:
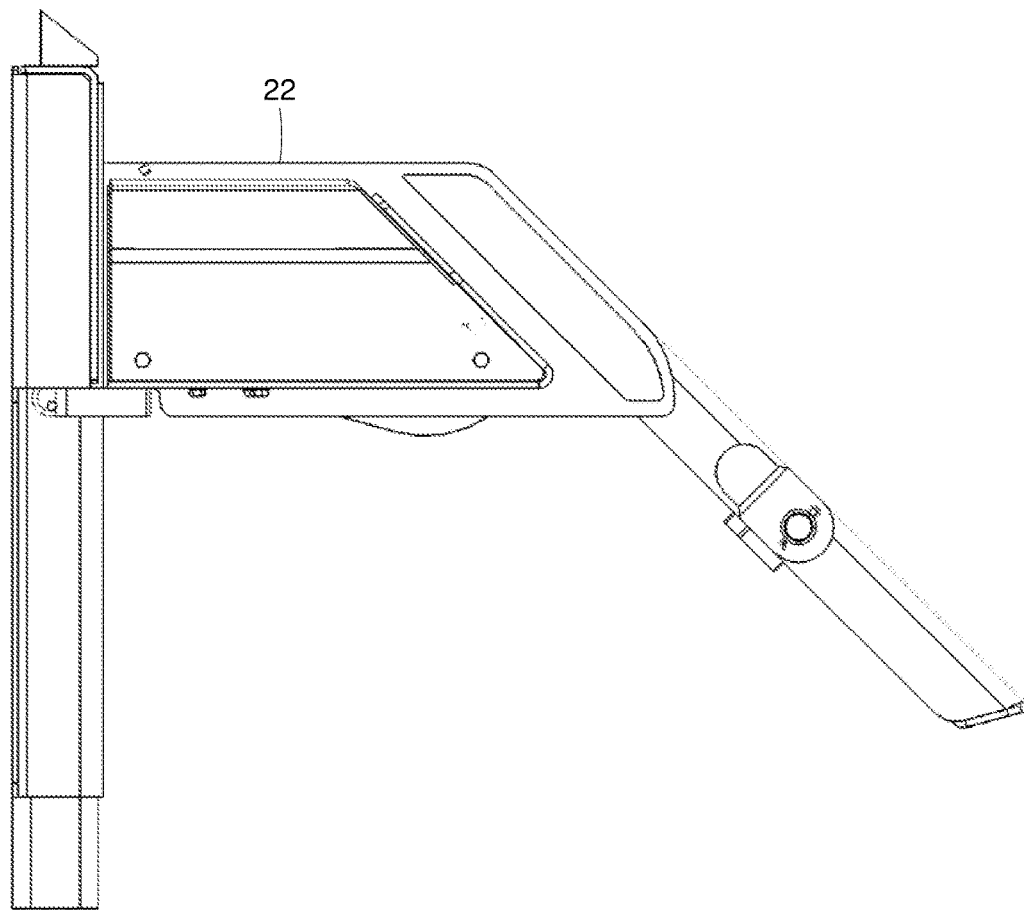
FIG. 20 is a left view of FIG. 17.
Figure 21:
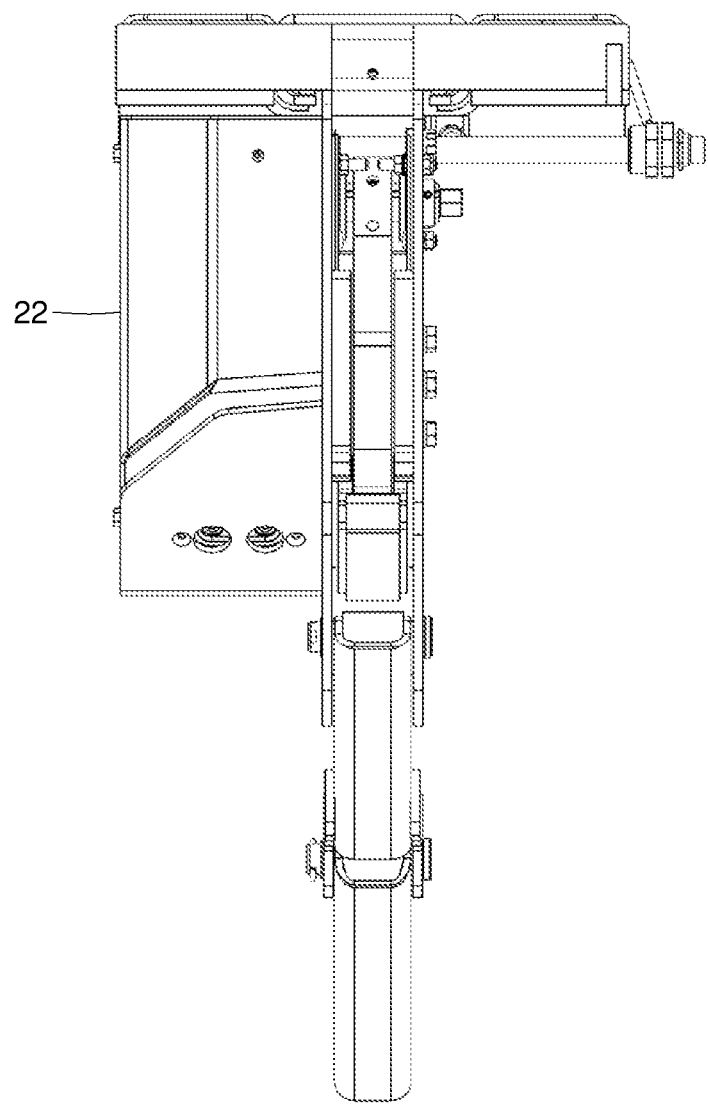
FIG. 21 is a top view of FIG. 17.
Figure 22:
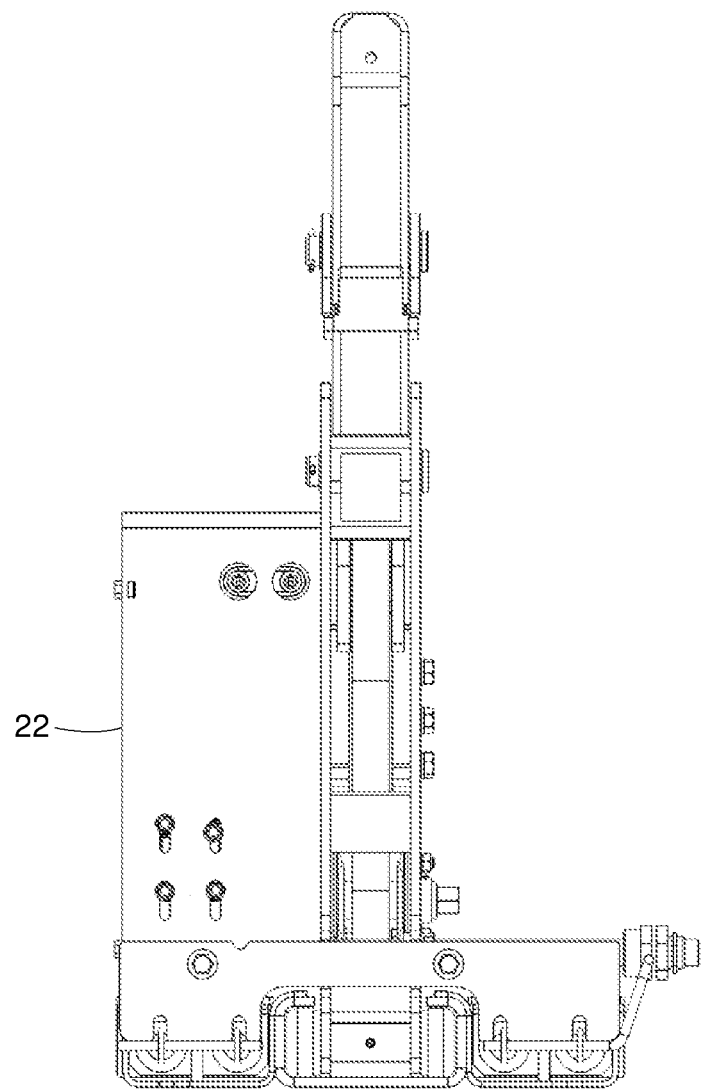
FIG. 22 is a bottom view of FIG. 17.

FIG. 16 shows a perspective view of one example of the alarm device 12*a*. FIG. 17 shows a front view the example alarm device 12*a* of FIG. 16. FIG. 18 shows a back view of the example alarm device 12*a* of FIG. 17. FIG. 19 shows a right view of the example alarm device 12*a* of FIG. 17. FIG. 20 shows a left view of the example alarm device 12*a* of FIG. 17. FIG. 21 shows a top view of the example alarm device 12*a* of FIG. 17. FIG. 22 shows a bottom view of the example alarm device 12*a* of FIG. 17.

Figure 23:
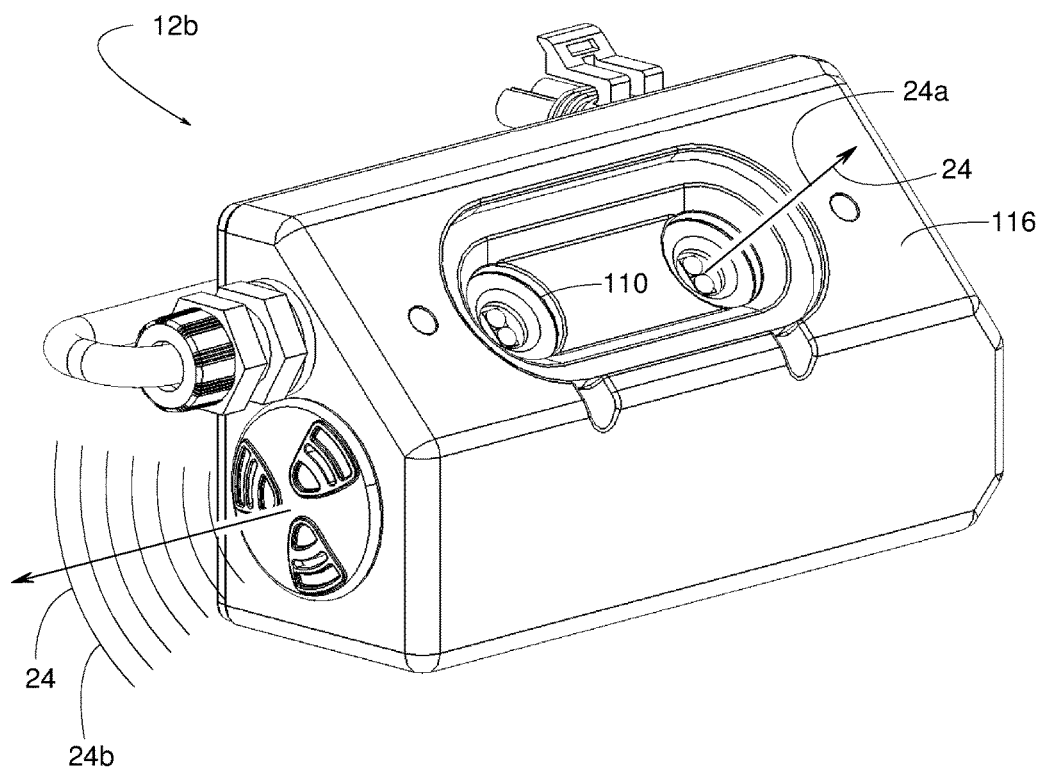
FIG. 23 is a perspective view of another example alarm device constructed in accordance with the teachings disclosed herein.
Figure 24:
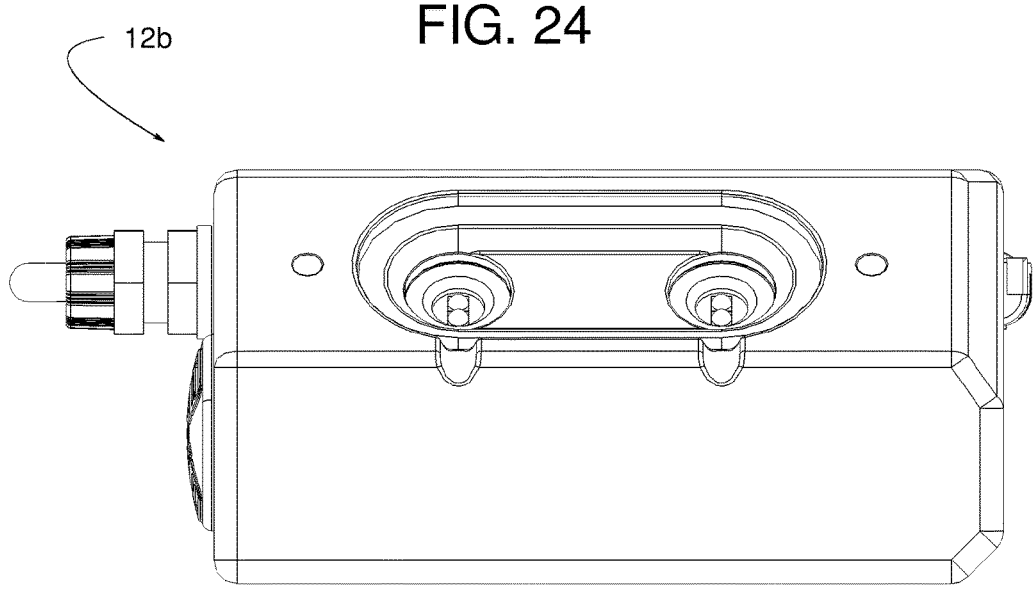
FIG. 24 is a right-front view of FIG. 23.
Figure 25:
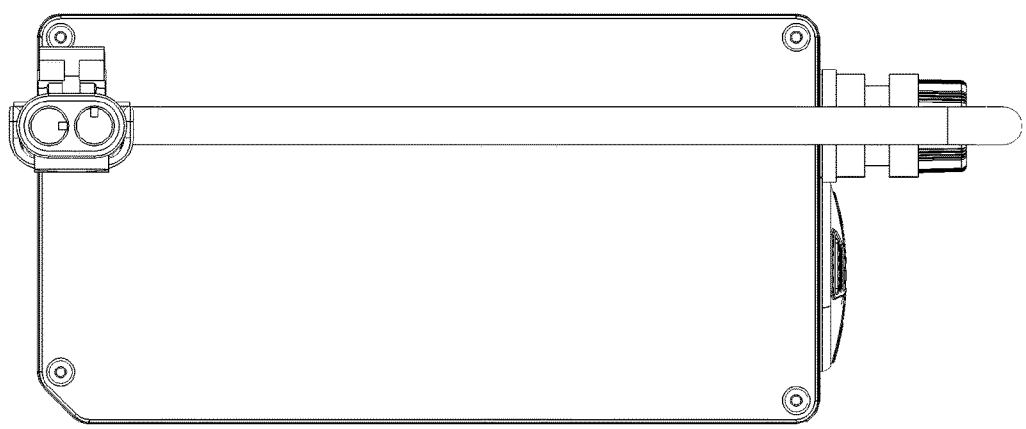
FIG. 25 is a back view of FIG. 24.
Figure 26:
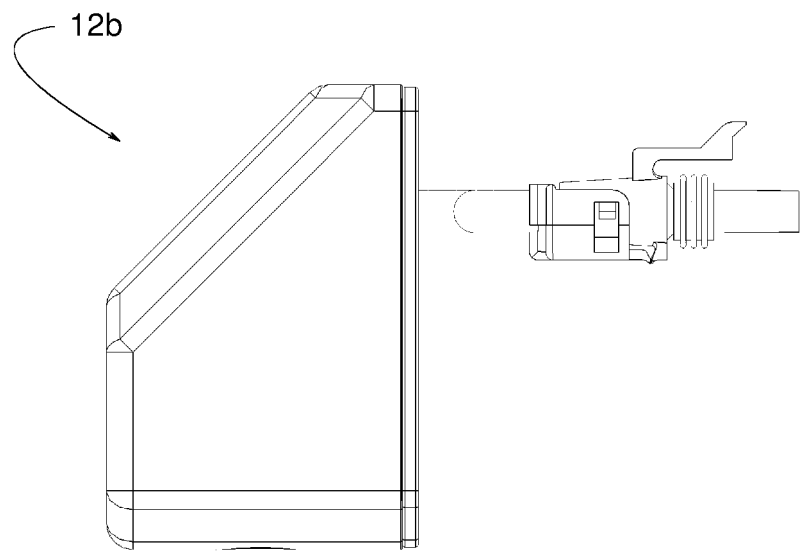
FIG. 26 is a right view of FIG. 24.
Figure 27:
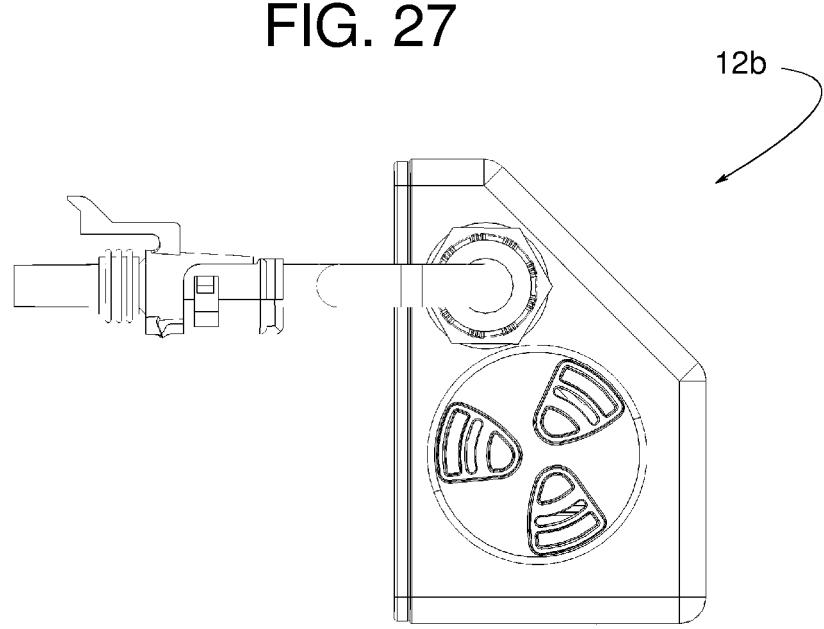
FIG. 27 is a left view of FIG. 24.
Figure 28:
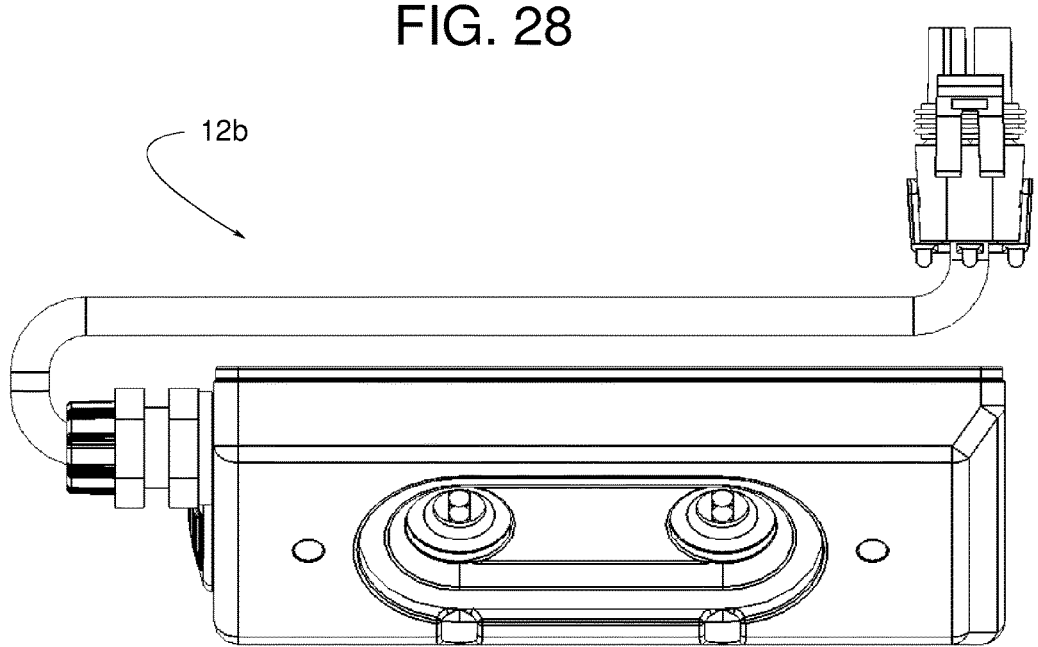
FIG. 28 is a top view of FIG. 24.
Figure 29:
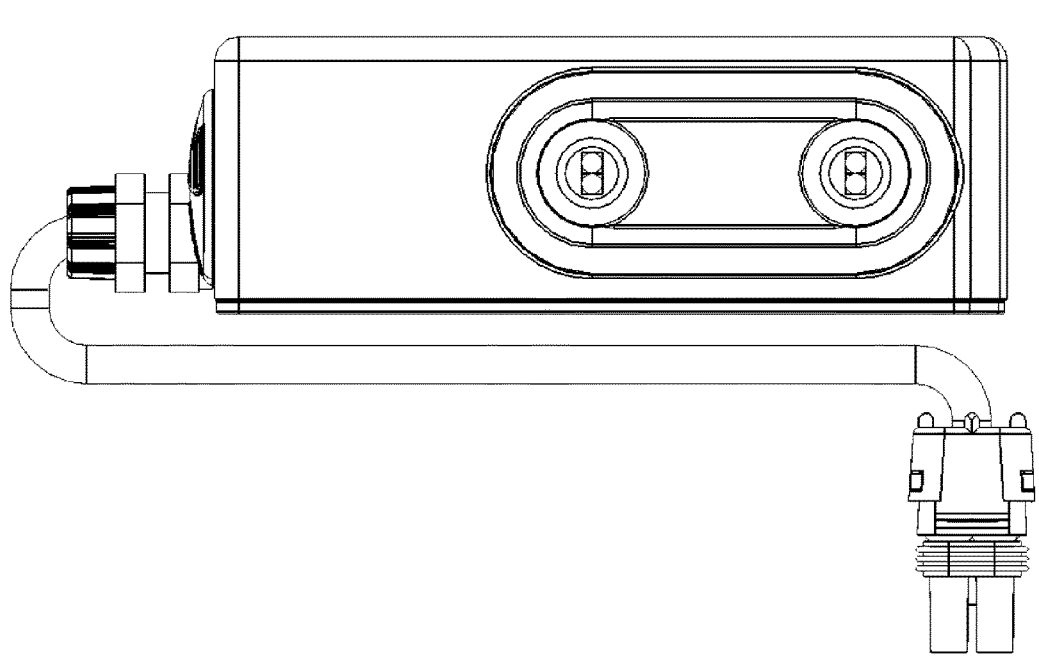
FIG. 29 is a bottom view of FIG. 24.

FIG. 23 shows a perspective view of one example of the alarm device 12*b*. FIG. 24 shows a front view of the example alarm device 12*b* of FIG. 23. FIG. 25 shows a back view of the example alarm device 12*b* of FIG. 24. FIG. 26 shows a right view of the example alarm device 12*b* of FIG. 24. FIG. 27 shows a left view of the example alarm device 12*b* of FIG. 24. FIG. 28 shows a top view of the example alarm device 12*b* of FIG. 24. FIG. 29 shows a bottom view of the example alarm device 12*b* of FIG. 24.

In some examples, the visual signal 12*a* of the alarm device 12*b* may be provided by a downward facing light (e.g., positioned underneath a housing of the alarm device 12*b*, or titled downward from a side of the housing). For example, the downward facing light may project the visual signal 12*a* in the form of a light or a warning signal (e.g., a light having a particular shape or indicia) onto the driveway 42 (e.g., at an area adjacent the alarm device 12*b*). For example, in FIG. 23, the alarm device 12*b* includes a plurality of visual signals 24*a* to be provided by lights 110. For example, the example alarm device 12*b* of FIG. 23 includes lights 110 projected in an upward direction from a front (e.g., tapered) surface of a housing 116 of the alarm device 12*b*. Thus, the front-facing lights 110 may be out of the view point of to a pedestrian standing adjacent a side of the alarm device 12*b* (e.g., behind the front surface (e.g., between the front surface and the wall 18)). However, the alarm device 12*b* (and any other alarm devices disclosed herein) includes the visual signal 24*a* to be provided via a light located at a bottom surface of the housing 116 and the light is to project the visual signal 24*a* onto the driveway 42, which can be visible to a pedestrian standing to the side of the example alarm device 12*b*. In some examples, the alarm device 12*b* may include an audio signal in the form of a horn.

Figure 30:
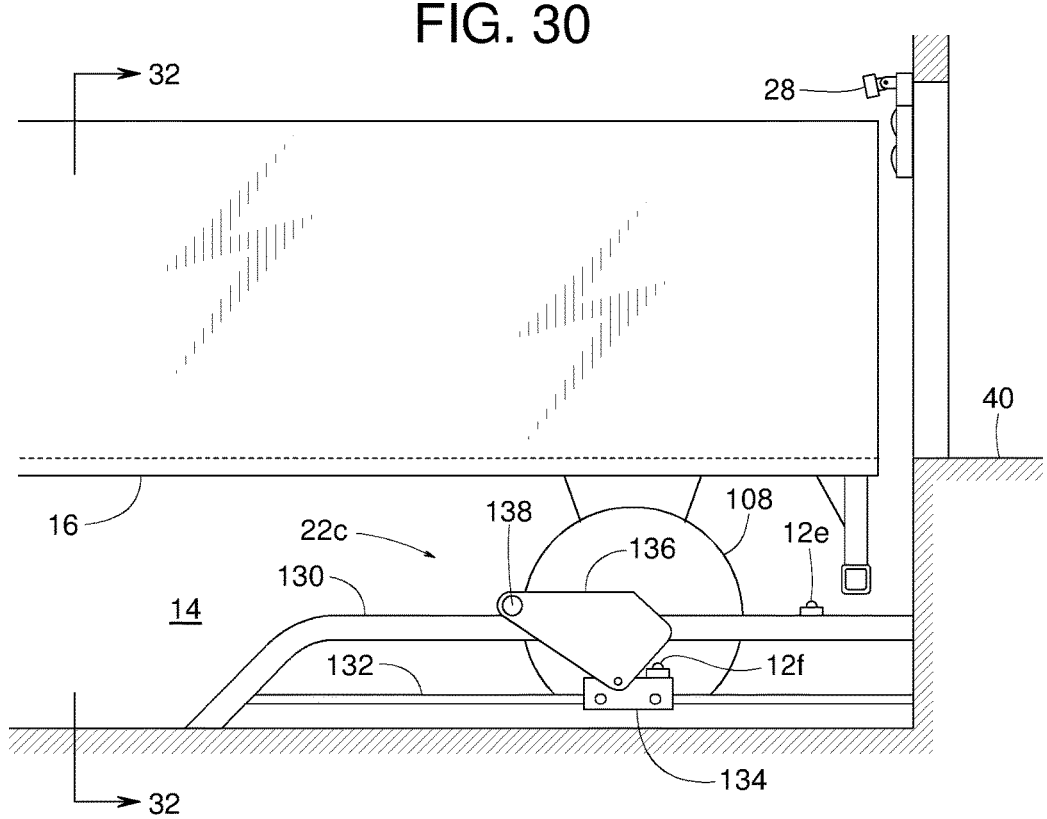
FIG. 30 is a side view of another example safety system with another example vehicle restraint disclosed herein and showing the example vehicle restraint in a blocking position.
Figure 31:
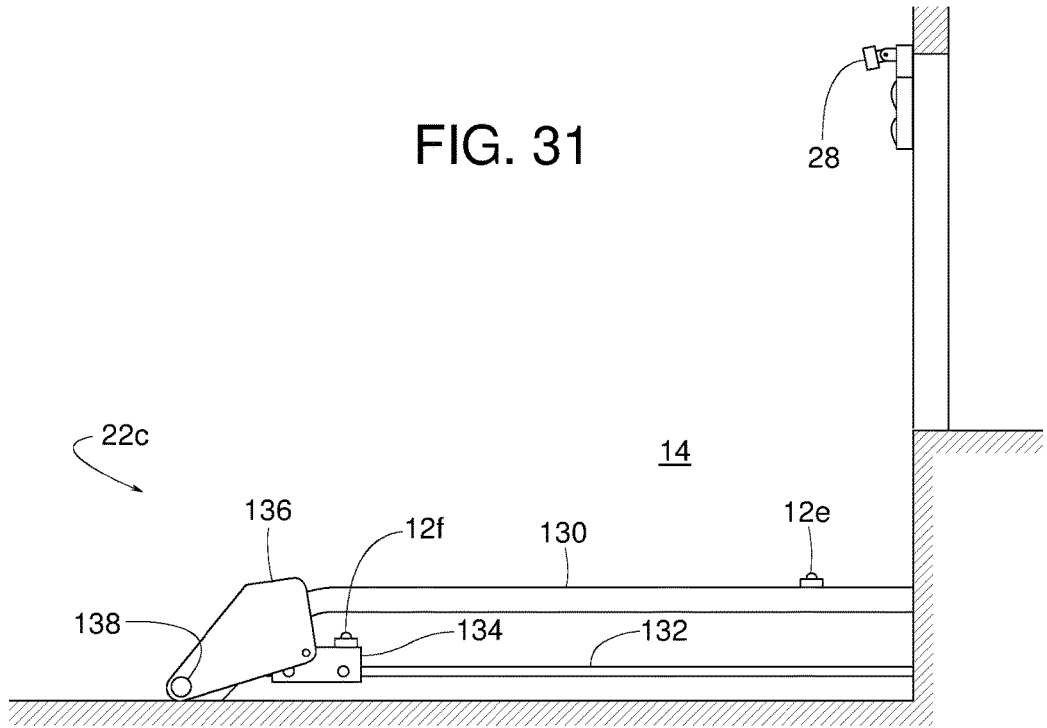
FIG. 31 is a side view similar to FIG. 30 but showing the example vehicle restraint in a release position.
Figure 32:
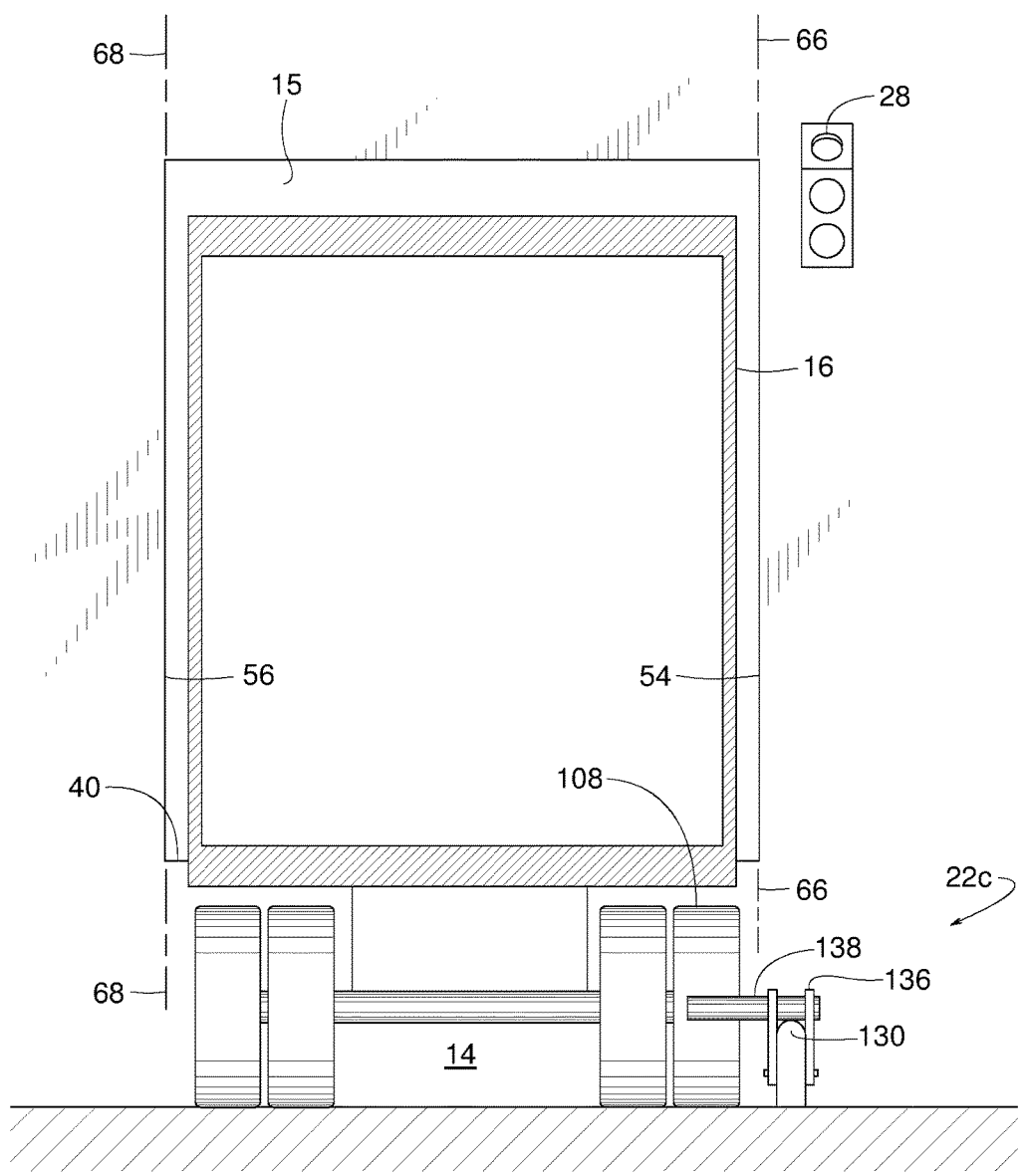
FIG. 32 is a cross-sectional view taken along line 32-32 of FIG. 30.

In addition or alternatively, some examples of the safety system 10 include other types of wheel-engaging vehicle restraints and/or alarm device mounting locations. FIGS. 30-32, for example, shows a wheel-engaging vehicle restraint 22*c* including an upper track 130, a lower track 132, a trolley 134 driven to travel along the lower track 132, a barrier support 136 coupled to the trolley 134, and a barrier 138 extending laterally from the barrier support 136. The trolley 134 moves the barrier 138 and the barrier support 136 along the upper track 130 between a stored configuration (FIG. 31) and an operative configuration (FIGS. 30 and 32). In the operative configuration, the barrier 138 engages the wheel 108 to restrain the vehicle 16 at the dock 14. In the stored configuration, the vehicle 16 is generally free to enter and leave the dock 14 without significant resistance from the barrier 138.

In the example shown in FIGS. 30-32, the alarm device 12*e* can be mounted at a fixed location below the doorway 15, but not necessarily between the doorway's two planes 66 and 68 or lateral edges 54 and 56. In the illustrated example, the alarm device 12*e* is mounted or coupled to the upper track 130. In other examples, the alarm device 12*e* is mounted at some other fixed or movable location. The alarm device 12*f*, for instance, is mounted to and travels with the trolley 134. Communication between the sensor 28 and the alarm devices 12*e* and 12*f* is substantially the same as the wireless and/or hardwired communication described with reference to alarm devices 12*a*-12*d*.

Figure 33:
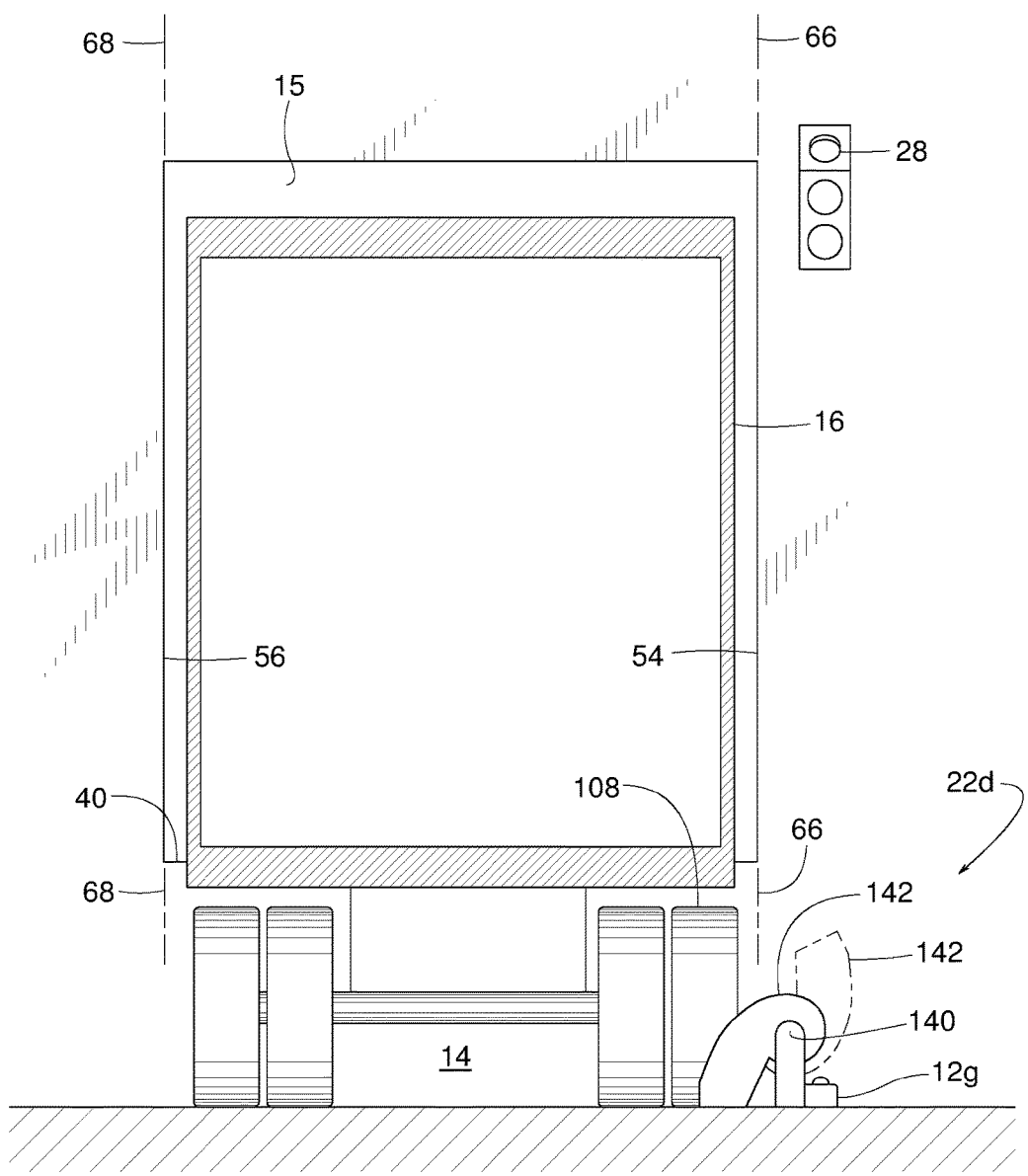
FIG. 33 is a cross sectional view similar to FIG. 32 but showing another example safety system with another example vehicle restraint disclosed herein.

In the example shown in FIG. 33, a wheel-engaging vehicle restraint 22*d* includes a track 140 and a barrier 142. The track 140 is (e.g., horizontally) elongate similar to the upper track 130 of FIGS. 30 and 31. The barrier 142 is movable (e.g., horizontally) in a forward and rearward direction along the track 140 so that the barrier 142 can be placed in front of the wheel 108. The barrier 142 is further rotatable about the track 140 between a wheel-blocking operative position (e.g., the barrier 142 shown in solid lines) and a stored configuration (e.g., the barrier 142 shown in phantom lines). In the illustrated example, the alarm device 12*g* is mounted at a generally fixed location below the doorway 15, but not necessarily between the doorway's planes 66 and 68 or lateral edges 54 and 56. In some examples, the alarm device 12*g* is mounted to a movable portion of the vehicle restraint 22*d*. Communication between the sensor 28 and the alarm device 12*g* is substantially the same as the wireless and/or hardwired communication described with reference to the alarm devices 12a-12d. Additional details of wheel-engaging vehicle restraints 22c and 22d are disclosed in U.S. Pat. Nos. 8,905,198; 8,499,897; 6,773,221; and 5,762,459; all of which are specifically incorporated herein by reference in their entireties.

At least some of the aforementioned examples include one or more features and/or benefits including, but not limited to, the following:

In some examples, a safety system includes a sensor installed at the loading dock. In some such examples, the sensor provides a feedback signal in response to sensing the vehicle. In some such examples, an alarm device is mounted at a lower elevation than that of the doorway. In some such examples, the alarm device is between the first lateral plane and the second lateral plane of the doorway. In some such examples, an alarm signal is emitted by the alarm device in response to the feedback signal.

In some examples, the vehicle is movable in a rearward direction from an approach position to a parked position, where the vehicle is closer to the wall when the vehicle is in the parked position than when the vehicle is in the approach position. In some such examples, the alarm device is at a higher elevation when the vehicle is at the approach position than when the vehicle is at the parked position.

In some examples, the alarm device is movable selectively to a raised position and a lowered position relative to the wall.

In some examples, the alarm device is movable selectively to a raised position and a lowered position relative to the touchless sensor.

In some examples, a vehicle restraint is installed at the loading dock. In some such examples, the vehicle restraint is configured selectively to a stored configuration and an operative configuration. In some examples, the vehicle restraint has a vehicle restraint component that is higher when the vehicle restraint is in the stored configuration than when the vehicle restraint is in the operative configuration. In some such examples, the alarm device is attached to and movable with the vehicle restraint component.

In some examples, a vehicle restraint is installed at the loading dock. In some such examples, the vehicle restraint is configured selectively to a stored configuration and an operative configuration. In some such examples, the vehicle restraint has a vehicle restraint housing that is higher relative to a ground vehicle travel surface when the vehicle restraint is in the stored configuration than when the vehicle restraint is in the operative configuration. In some such examples, the vehicle restraint housing shelters an electrical wire of the vehicle restraint. In some such examples, the alarm device is attached to and movable with the vehicle restraint housing.

In some examples, a vehicle restraint is installed at the loading dock. In some such examples, the vehicle restraint is configured selectively to a stored configuration and an operative configuration. In some such examples, the vehicle restraint is disengaged from the vehicle when the vehicle restraint is in the stored configuration. In some such examples, the vehicle restraint engages and restrains the vehicle when the vehicle restraint is in the operative configuration. In some such examples, a signal device emits selectively a generally red light and a generally green light. In some such examples, the generally green light indicates the vehicle restraint is in the stored configuration and the generally red light indicates the vehicle restraint is in the operative configuration. In some such examples, a first enclosure housing the signal device. In some such examples, a second enclosure housing the alarm device. In some such examples, the second enclosure is spaced apart from the first enclosure, and the first enclosure is at a higher elevation than the second enclosure.

In some examples, the sensor is electrically wired to the signal device, and the sensor is closer to the signal device than to the alarm device.

In some such examples, a vehicle restraint is installed at the loading dock. In some such examples, the vehicle restraint is configured selectively to a stored configuration and an operative configuration. In some such examples, the vehicle restraint is disengaged from the vehicle when the vehicle restraint is in the stored configuration. In some such examples, the vehicle restraint engages the vehicle when the vehicle restraint is in the operative configuration. In some such examples, the alarm device is electrically coupled to the vehicle restraint.

In some examples, a vehicle restraint is installed at the loading dock. In some such examples, the vehicle restraint is configured selectively to a stored configuration and an operative configuration. In some such examples, the vehicle restraint is disengaged from the vehicle when the vehicle restraint is in the stored configuration. In some such examples, the vehicle restraint engages the vehicle when the vehicle restraint is in the operative configuration. In some such examples, the alarm device is closer to the vehicle restraint than to the sensor.

In some examples, the alarm signal is a graphical display.

In some examples, a vehicle restraint is installed at the loading dock. In some such examples, the vehicle restraint is to selectively engage and disengage the vehicle. In some such examples, the alarm device is carried by the vehicle restraint. In some such examples, the alarm device includes a light-emitting diode having sufficient mechanical shock resistance to withstand a mechanical shock produced by the vehicle restraint when engaging and disengaging the vehicle.

In some examples, a dock leveler is at the doorway. In some such examples, the dock leveler includes a dock leveler frame that is substantially stationary and a deck pivotally coupled to the dock leveler frame. In some such examples, the alarm device is attached to the dock leveler frame.

In some examples, a safety system includes a sensor installed at a substantially fixed location at the loading dock. In some such examples, the sensor provides a feedback signal in response to sensing the vehicle. In some such examples, an alarm device is mounted at the loading dock and is configured to receive the feedback signal from the sensor. In some such examples, the alarm device is movable relative to the sensor in response to the vehicle approaching the doorway. In some such examples, an alarm signal is emitted by the alarm device in response to the feedback signal.

In some examples, the vehicle is movable in a rearward direction from an approach position to a parked position. In some such examples, the vehicle is closer to the wall when the vehicle is in the parked position than when the vehicle is in the approach position. In some such examples, the alarm device is at a higher elevation relative to ground when the vehicle is at the approach position than when the vehicle is at the parked position.

In some examples, a vehicle restraint is installed at the loading dock. In some such examples, the vehicle restraint is configured selectively to a stored configuration and an operative configuration. In some such examples, the vehicle restraint has a vehicle restraint component that is at a higher elevation relative to ground when the vehicle restraint is in the stored configuration than when the vehicle restraint is in the operative configuration. In some such examples, the alarm device is attached to and movable with the vehicle restraint component.

In some examples, a vehicle restraint is installed at the loading dock. In some such examples, the vehicle restraint is configured selectively to a stored configuration and an operative configuration. In some such examples, the vehicle restraint has a vehicle restraint housing having an elevation relative to ground that is higher when the vehicle restraint is in the stored configuration than when the vehicle restraint is in the operative configuration. In some such examples, the vehicle restraint housing houses an electrical wire of the vehicle restraint. In some such examples, the alarm device is attached to and movable with the vehicle restraint housing.

In some examples, a vehicle restraint is installable at the loading dock. In some such examples, the vehicle restraint is configurable selectively to a stored configuration and an operative configuration. In some such examples, the vehicle restraint is to disengage the vehicle when the vehicle restraint is in the stored configuration. In some such examples, the vehicle restraint is to engage and restrain the vehicle when the vehicle restraint is in the operative configuration. In some such examples, a signal device is to emit selectively a generally red light and a generally green light. In some such examples, the generally green light to indicate the vehicle restraint is in the stored configuration and the generally red light to indicate the vehicle restraint is in the operative configuration. In some such examples, a first enclosure houses the signal device. In some such examples, a second enclosure houses the alarm device. In some such examples, the second enclosure is spaced apart from the first enclosure. In some such examples, the first enclosure is positioned at a higher elevation relative to ground than the second enclosure.

In some examples, the sensor is electrically wired to the signal device, and the sensor is closer to the signal device than to the alarm device.

In some examples, a vehicle restraint is installed at the loading dock. In some such examples, the vehicle restraint is configured selectively to a stored configuration and an operative configuration. In some such examples, the vehicle restraint is to disengage the vehicle when the vehicle restraint is in the stored configuration. In some such examples, the vehicle restraint is to engage the vehicle when the vehicle restraint is in the operative configuration. In some such examples, the alarm device is electrically coupled to the vehicle restraint.

In some examples, a vehicle restraint is installed at the loading dock. In some such examples, the vehicle restraint is configured selectively to a stored configuration and an operative configuration. In some such examples, the vehicle restraint is to disengage the vehicle when the vehicle restraint is in the stored configuration. In some such examples, the vehicle restraint is to engage the vehicle when the vehicle restraint is in the operative configuration. In some such examples, the alarm device is closer to the vehicle restraint than to the sensor.

In some examples, a safety system includes a sensor installable at the loading dock. In some such examples, the sensor is to provide a feedback signal in response to sensing the vehicle. In some such examples, an alarm device is to be electrically wired to the electrical component of the vehicle restraint. In some such examples, the alarm device is configured to receive the feedback signal from the sensor. In some such examples, an alarm signal is emitted by the alarm device in response to the feedback signal.

In some examples, the vehicle is movable in a rearward direction from an approach position to a parked position. In some such examples, the vehicle is closer to the wall when the vehicle is in the parked position than when the vehicle is in the approach position. In some such examples, the alarm device is at a higher elevation when the vehicle is at the approach position than when the vehicle is at the parked position.

In some examples, the vehicle restraint is configurable selectively to a stored configuration and an operative configuration. In some such examples, the vehicle restraint includes a vehicle restraint component having an elevation relative to ground that is higher when the vehicle restraint is in the stored configuration than when the vehicle restraint is in the operative configuration. In some such examples, the alarm device is attached to and movable with the vehicle restraint component.

In some examples, the vehicle restraint is configurable selectively to a stored configuration and an operative configuration. In some such examples, the vehicle restraint includes a vehicle restraint housing having an elevation relative to ground that is higher when the vehicle restraint is in the stored configuration than when the vehicle restraint is in the operative configuration. In some such examples, the vehicle restraint housing is to shelter the electrical component of the vehicle restraint. In some such examples, the alarm device is attached to and movable with the vehicle restraint housing.

In some examples, the vehicle restraint is configurable selectively to a stored configuration and an operative configuration. In some such examples, the vehicle restraint is disengaged from the vehicle when the vehicle restraint is in the stored configuration. In some such examples, the vehicle restraint is to engage and restrain the vehicle when the vehicle restraint is in the operative configuration. In some such examples, the safety system includes a signal device to emit selectively a generally red light and a generally green light. In some such examples, the generally green light is to indicate the vehicle restraint is in the stored configuration and the generally red light is to indicate the vehicle restraint is in the operative configuration. In some such examples, a first enclosure housing the signal device. In some such examples, a second enclosure houses the alarm device. In some such examples, the second enclosure is spaced apart from the first enclosure. In some such examples, the first enclosure is at an elevation relative to ground that is higher than an elevation of the second enclosure.

In some examples, the sensor is electrically wired to the signal device, and the sensor is closer to the signal device than to the alarm device.

In some examples, the alarm device is closer to the vehicle restraint than to the sensor.

In some examples, a safety system includes a touchless sensor installed at the loading dock. In some such examples, the touchless sensor provides a feedback signal in response to sensing the vehicle. In some such examples, an alarm device is spaced apart from the wall and is mounted at a lower elevation than that of the doorway. In some such examples, an alarm signal is emitted by the alarm device in response to the feedback signal.

In some examples, a vehicle restraint is installed at the loading dock. In some such examples, the vehicle restraint is configured selectively to a stored configuration and an operative configuration. In some such examples, the vehicle restraint is disengaged from the wheel when the vehicle restraint is in the stored configuration. In some such examples, the vehicle restraint is to engage the wheel when the vehicle restraint is in the operative configuration. In some such examples, the alarm device is electrically wired to the vehicle restraint.

In some examples, a vehicle restraint is installed at the loading dock. In some such examples, the vehicle restraint is configured selectively to a stored configuration and an operative configuration. In some such examples, the vehicle restraint is disengaged from the wheel when the vehicle restraint is in the stored configuration. In some such examples, the vehicle restraint engages the wheel when the vehicle restraint is in the operative configuration. In some such examples, the alarm device is closer to the vehicle restraint than to the touchless sensor.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A safety system for a loading dock to receive a vehicle approaching a doorway in a wall at the loading dock, the safety system comprising:
   a sensor at the loading dock to sense the vehicle approaching the loading dock, the first sensor to provide a first signal in response to the vehicle approaching the loading dock;
   an alarm device mounted at a lower elevation than a lowermost edge defining an opening of the doorway, the alarm device being between a first lateral edge and a second lateral edge of the opening defining the doorway, the alarm device to provide an alarm signal to warn a pedestrian in a path of the approaching vehicle in response to the first signal; and
   a signal device mounted adjacent the first lateral edge of the doorway and at a higher elevation relative to the alarm device, the signal device configured to provide a status signal to a driver of the vehicle, the status signal being independent from the alarm signal.

2. The safety system of claim 1, wherein the vehicle is movable in a rearward direction from an approach position to a parked position, the vehicle being closer to the wall when the vehicle is in the parked position than when the vehicle is in the approach position, the alarm device being at a higher elevation when the vehicle is at the approach position than when the vehicle is at the parked position.

3. The safety system of claim 1, wherein the alarm device is movable to a raised position and a lowered position relative to the wall.

4. The safety system of claim 1, wherein the alarm device is movable to a raised position and a lowered position relative to the first sensor.

5. The safety system of claim 1, further comprising a vehicle restraint at the loading dock, the vehicle restraint having a stored position and an operative position, the vehicle restraint having a vehicle restraint component that is higher when the vehicle restraint is in the stored position than when the vehicle restraint is in the operative position, the alarm device being attached to and movable with the vehicle restraint component.

6. The safety system of claim 1, further comprising a vehicle restraint at the loading dock, the vehicle restraint having a stored configuration and an operative configuration, the vehicle restraint having a vehicle restraint housing that is higher relative to a travel surface when the vehicle restraint is in the stored configuration than when the vehicle restraint is in the operative configuration, the vehicle restraint sheltering an electrical wire of the vehicle restraint, the alarm device being attached to and movable with the vehicle restraint housing.

7. The safety system of claim 1, further comprising:
   a vehicle restraint at the loading dock, the vehicle restraint configurable between a stored configuration and an operative configuration, the vehicle restraint being disengaged from the vehicle when the vehicle restraint is in the stored configuration, the vehicle restraint to engage and restrain the vehicle when the vehicle restraint is in the operative configuration;
   the signal device to emit selectively a red light and a green light, the green light to indicate the vehicle restraint is in the stored configuration, and the red light to indicate the vehicle restraint is in the operative configuration;
   a first enclosure housing the signal device; and
   a second enclosure housing the alarm device, the second enclosure being spaced apart from the first enclosure, and the first enclosure being at a higher elevation than the second enclosure.

8. The safety system of claim 7, wherein the sensor is electrically wired to the signal device, and the first sensor is closer to the signal device than to the alarm device.

9. The safety system of claim 1, further comprising a vehicle restraint installed at the loading dock, the vehicle restraint being configurable in a stored configuration and an operative configuration, the vehicle restraint being disengaged from the vehicle when the vehicle restraint is in the stored configuration, the vehicle restraint to engage the vehicle when the vehicle restraint is in the operative configuration, and the alarm device being electrically coupled to the vehicle restraint.

10. The safety system of claim 1, further comprising a vehicle restraint installed at the loading dock, the vehicle restraint movable between a stored configuration and an operative configuration, the vehicle restraint being disengaged from the vehicle when the vehicle restraint is in the stored configuration, the vehicle restraint to engage the vehicle when the vehicle restraint is in the operative configuration, and the alarm device being closer to the vehicle restraint than to the first sensor.

11. The safety system of claim 1, wherein the alarm signal is a graphical display.

12. The safety system of claim 1, further comprising a vehicle restraint at the loading dock, the vehicle restraint to selectively engage and disengage the vehicle, the alarm device carried by the vehicle restraint, the alarm device including a light-emitting diode having sufficient mechanical shock resistance to withstand a mechanical shock produced by the vehicle restraint when engaging the vehicle and when disengaging the vehicle.

13. The safety system of claim 1, further comprising a dock leveler at the doorway, the dock leveler comprising a dock leveler frame that is substantially stationary and a deck pivotally coupled to the dock leveler frame, the alarm device being attached to the dock leveler frame.

14. A safety system for a loading dock for a vehicle approaching a doorway in a wall at the loading dock, the safety system comprising:
   a pedestrian warning system to inform a pedestrian of an approaching vehicle, the pedestrian warning system including:
      a first sensor installable at a substantially fixed location at the loading dock, the first sensor to provide a first feedback signal in response to sensing the vehicle approaching the loading dock; and an alarm device configured to receive the first signal from the first sensor, the alarm device to emit at least one of an audible alert or a visual alert in response to the first feedback signal to warn a pedestrian in a path of the approaching vehicle; and
a vehicle warning system to inform a driver of a vehicle of a status of a vehicle restraint at the loading dock, the vehicle warning system to operate independently from the pedestrian warning system, the vehicle warning system including:
a signal device to receive a second signal and to emit a communication to a driver of the vehicle, the second signal being different from the first signal.

15. The safety system of claim 14, further comprising:
a first enclosure housing the signal device; and
a second enclosure housing the alarm device, the second enclosure spaced apart from the first enclosure, the first enclosure positioned at a higher elevation relative to ground than the second enclosure.

16. The safety system of claim 15, wherein the first sensor is electrically wired to the signal device, and the first sensor is closer to the signal device than to the alarm device.

17. The safety system of claim 14, wherein the alarm device is to be closer to the vehicle restraint than to the first sensor.

18. The safety system of claim 14, further including:
a vehicle restraint to restrain the vehicle at the loading dock, the vehicle restraint having a stored position and an operative position; and
a second sensor to provide the second signal representative of the vehicle restraint being in the stored position or the operative position.

19. The safety system of claim 18, further including a vehicle restraint, wherein the vehicle restraint includes at least one of a hook or a wheel chock.

20. A safety system for a loading dock configured to receive a vehicle approaching a doorway in a wall at the loading dock, the safety system comprising:
a sensor installable at a substantially fixed location at the loading dock, the sensor providing a feedback signal in response to sensing the vehicle approaching the loading dock, the vehicle being closer to the wall when the vehicle is in a parked position than when the vehicle is in an approach position;
a vehicle restraint to restrain the vehicle at the loading dock, the vehicle restraint being configured selectively to a stored configuration and an operative configuration;
an alarm device coupled to and movable with the vehicle restraint, the alarm device being configured to receive the feedback signal from the sensor, the alarm device being movable relative to the sensor in response to the vehicle approaching the doorway, the alarm device to emit at least one of an audible alert or a visual alert in response to the feedback signal sensing the vehicle to warn a pedestrian in a path of the approaching vehicle, the alarm device being at a higher elevation when the vehicle is at the approach position than when the vehicle is at the parked position.

21. A safety system for a loading dock configured to receive a vehicle approaching a doorway in a wall at the loading dock, and the vehicle including a wheel, the safety system comprising:
at least one of a shelter or a seal coupled to the wall adjacent a perimeter of the doorway;
a sensor installable at the loading dock at an elevation above a lowermost edge of the doorway and outside a perimeter of the at least one of the shelter or the seal, the sensor to provide a feedback signal in response to sensing the vehicle approaching the doorway of the loading dock;
a signal device installable at the loading dock at an elevation above the lowermost edge of the doorway and outside a perimeter of the at least one of the shelter or the seal, the signal device to emit selectively a first light and a second light different than the first light to provide information to a driver of the vehicle; and
an alarm device installable at the loading dock at an elevation below the lowermost opening of the doorway, the alarm device to emit at least one of an audible signal or a visual signal in response to the feedback signal from the sensor and that is representative of the approaching vehicle to warn a pedestrian in a pathway of the approaching vehicle, the alarm device to be hidden from a line of sight of a driver of the vehicle backing into the loading dock and the signal device to remain in the line of sight of the driver of the vehicle backing into the loading dock.

22. The safety system of claim 21, further comprising a vehicle restraint installed at the loading dock, the vehicle restraint being configured selectively to a stored configuration and an operative configuration, the vehicle restraint to disengage the wheel when the vehicle restraint is in the stored configuration, the vehicle restraint to engage the wheel when the vehicle restraint is in the operative configuration, and the alarm device being electrically wired to the vehicle restraint.

23. The safety system of claim 21, further comprising a vehicle restraint installed at the loading dock, the vehicle restraint being configured selectively to a stored configuration and an operative configuration, the vehicle restraint being disengaged from the wheel when the vehicle restraint is in the stored configuration, the vehicle restraint engaging the wheel when the vehicle restraint is in the operative configuration, and the alarm device being closer to the vehicle restraint than to the sensor.

* * * * *

UNITED STATES PATENT AND TRADEMARK OFFICE
CERTIFICATE OF CORRECTION

PATENT NO. : 10,392,205 B2
APPLICATION NO. : 15/813440
DATED : August 27, 2019
INVENTOR(S) : James J. Boston and Troy L. Russell It is certified that error appears in the above-identified patent and that said Letters Patent is hereby corrected as shown below:

In the Claims

Column 13, Line 26 (Claim 1), replace "the first sensor" with --the sensor--

Signed and Sealed this
Twenty-second Day of October, 2019

Andrei Iancu
*Director of the United States Patent and Trademark Office*